(12) United States Patent
Ghosh et al.

(10) Patent No.: US 9,852,384 B2
(45) Date of Patent: Dec. 26, 2017

(54) WEB-BASED VISUAL REPRESENTATION OF A STRUCTURED DATA SOLUTION

(75) Inventors: Dipanjan Ghosh, Redmond, WA (US); Ashvin J. Mathew, Kirkland, WA (US); Rajagopalan Badri Narayanan, Redmond, WA (US); Preethi Ramarathinam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/969,310

(22) Filed: Dec. 15, 2010

(65) Prior Publication Data

US 2011/0209045 A1   Aug. 25, 2011

Related U.S. Application Data

(60) Provisional application No. 61/307,054, filed on Feb. 23, 2010.

(51) Int. Cl.
*G06F 17/00* (2006.01)
*G06Q 10/06* (2012.01)
(Continued)

(52) U.S. Cl.
CPC ............. *G06Q 10/06* (2013.01); *G06Q 10/10* (2013.01); *G06F 17/243* (2013.01)

(58) Field of Classification Search
CPC .......................... G06F 17/2241; G06F 17/243
(Continued)

(56) References Cited

U.S. PATENT DOCUMENTS

| 6,061,059 A | 5/2000 | Taylor et al. |
| 6,684,369 B1 | 1/2004 | Bernardo et al. |

(Continued)

FOREIGN PATENT DOCUMENTS

| CN | 1606015 A | 4/2005 |
| CN | 1758274 A | 4/2006 |

(Continued)

OTHER PUBLICATIONS

International Search Report and Written Opinion dated Aug. 29, 2011 in Application No. PCT/US2011/021122.

(Continued)

*Primary Examiner* — Scott Baderman
*Assistant Examiner* — Howard Cortes

(57) ABSTRACT

Information from a business application system, such as an ERP system, may be published to a business application user-generated web page for display to an end user and for collecting information from an end user to make available for download into the business application system. The user-generated web page may be defined as a web-based visual representation of a structured data solution, which may define data, data presentation, and data binding metadata for enabling a solution scenario, such as vendor enrollment, sourcing, time entry, job listings, vendor-managed inventory, sales lead capture, purchase order/invoicing, service contract renewal, and customer support requests, and the like. Business application users may be enabled to connect with potential and existing customers, partners, and vendors from within the business application system via the web-based visual representation, and additionally, may capture interactions directly into the business application system without IT dependency.

19 Claims, 17 Drawing Sheets

(51) Int. Cl.
*G06Q 10/10* (2012.01)
*G06F 17/24* (2006.01)

(58) Field of Classification Search
USPC .......................... 719/311; 715/203, 224, 222
See application file for complete search history.

(56) References Cited

U.S. PATENT DOCUMENTS

| | | | |
|---|---|---|---|
| 6,854,120 B1* | 2/2005 | Lo et al. .................... | 719/311 |
| 7,093,200 B2* | 8/2006 | Schreiber et al. ........... | 715/835 |
| 7,269,795 B2* | 9/2007 | Whittenberger ............. | 715/764 |
| 7,286,999 B2 | 10/2007 | Majd et al. | |
| 7,496,687 B2* | 2/2009 | Griffin et al. .............. | 709/249 |
| 7,546,312 B1 | 6/2009 | Xu et al. | |
| 7,650,276 B2 | 1/2010 | O'Neil et al. | |
| 8,122,346 B2* | 2/2012 | Bezrukov et al. ........... | 715/253 |
| 2002/0165724 A1* | 11/2002 | Blankesteijn .................. | 705/1 |
| 2002/0184170 A1 | 12/2002 | Gilbert et al. | |
| 2003/0018644 A1 | 1/2003 | Bala et al. | |
| 2003/0227900 A1* | 12/2003 | Watanabe .................... | 370/350 |
| 2003/0233404 A1 | 12/2003 | Hopkins | |
| 2004/0123302 A1 | 6/2004 | Lo et al. | |
| 2004/0215643 A1 | 10/2004 | Brechner et al. | |
| 2004/0267700 A1 | 12/2004 | Dumais et al. | |
| 2005/0044164 A1* | 2/2005 | O'Farrell .......... | G06F 17/30557 709/213 |
| 2005/0060325 A1 | 3/2005 | Bakalash et al. | |
| 2005/0119910 A1 | 6/2005 | Schneider | |
| 2006/0015619 A1* | 1/2006 | Tse ...................... | H04L 67/2823 709/226 |
| 2006/0031539 A1* | 2/2006 | Ferris et al. .................. | 709/228 |
| 2006/0095447 A1* | 5/2006 | Dickinson ............. | G06F 17/246 |
| 2007/0061371 A1 | 3/2007 | Bodin et al. | |
| 2007/0073695 A1 | 3/2007 | Conlan et al. | |
| 2007/0156731 A1 | 7/2007 | Ben-Zeev | |
| 2007/0214064 A1* | 9/2007 | Kahlon et al. ................. | 705/28 |
| 2007/0234271 A1 | 10/2007 | Winkler | |
| 2007/0260475 A1* | 11/2007 | Bhanote ................. | G06Q 30/02 705/1.1 |
| 2007/0282616 A1* | 12/2007 | Brunswig et al. ................ | 705/1 |
| 2008/0209345 A1 | 8/2008 | Cannata et al. | |
| 2008/0319983 A1* | 12/2008 | Meadows ......................... | 707/5 |
| 2009/0063472 A1 | 3/2009 | Pell et al. | |
| 2009/0064105 A1 | 3/2009 | Lo et al. | |
| 2009/0164493 A1 | 6/2009 | Johnsgard | |
| 2009/0193107 A1* | 7/2009 | Srinivasan ........ | G06F 17/30132 709/223 |
| 2009/0198787 A1* | 8/2009 | Broda et al. .................. | 709/209 |
| 2009/0307258 A1 | 12/2009 | Priyadarshi et al. | |
| 2010/0070448 A1 | 3/2010 | Omoigui | |
| 2011/0151837 A1* | 6/2011 | Winbush, III .......... | H04W 8/22 455/412.1 |
| 2011/0179045 A1 | 7/2011 | Caldwell et al. | |
| 2011/0179060 A1 | 7/2011 | Chilakamarri et al. | |
| 2011/0179061 A1 | 7/2011 | Chilakamarri et al. | |
| 2011/0191407 A1 | 8/2011 | Fu et al. | |
| 2011/0208786 A1 | 8/2011 | Ghosh et al. | |
| 2011/0209049 A1 | 8/2011 | Ghosh et al. | |
| 2014/0250062 A1* | 9/2014 | Vroom .............. | G06F 17/30578 707/618 |

FOREIGN PATENT DOCUMENTS

| | | |
|---|---|---|
| CN | 100347696 C | 11/2007 |
| CN | 101110021 A | 1/2008 |
| JP | 2002-312682 | 10/2002 |
| JP | 2002-342360 | 11/2002 |
| JP | 2009-205289 | 9/2009 |
| KR | 10-2004-0031899 | 4/2004 |
| KR | 10-2005-0027820 | 3/2005 |
| KR | 10-2009-0000199 | 1/2009 |
| WO | WO 03/083690 A1 | 10/2003 |
| WO | 03/093964 A1 | 11/2003 |
| WO | 2004/077268 A2 | 9/2004 |

OTHER PUBLICATIONS

International Search Report and Written Opinion dated Aug. 30, 2011 in Application No. PCT/US2011/021143.
International Search Report and Written Opinion dated Aug. 30, 2011 in Application No. PCT/US2011/021174.
International Search Report and Written Opinion dated Sep. 20, 2011 in Application No. PCT/US2011/021164.
U.S. Appl. No. 12/969,170, filed Dec. 15, 2010.
U.S. Appl. No. 12/969,397, filed Dec. 15, 2010.
Office Action dated Sep. 26, 2012, in co-pending U.S. Appl. No. 12/969,397.
International Search Report and Written Opinion cited in International Application No. PCT/US2011/024101 dated Sep. 23, 2011.
International Search Report and Written Opinion cited in International Application No. PCT/US2011/025600 dated Sep. 23, 2011.
International Search Report and Written Opinion cited in International Application No. PCT/US2011/025601 dated Sep. 23, 2011.
Office Action dated Feb. 10, 2014, in co-pending U.S. Appl. No. 12/969,170.
Office Action dated Jun. 4, 2013, in co-pending U.S. Appl. No. 12/969,397.
Office Action dated Jul. 17, 2013, in co-pending U.S. Appl. No. 12/969,170.
Office Action dated Dec. 19, 2013, in co-pending U.S. Appl. No. 12/969,397.
Chinese First Office Action cited in Application No. 201180010559.7 dated Dec. 25, 2014.
Chinese First Office Action cited in Application No. 201180010593.4 dated Dec. 31, 2014.
Chinese First Office Action cited in Application No. 201180010461.1 dated Feb. 3, 2015.
European Search Report cited in Application No. 11747852.9 dated Dec. 5, 2014.
European Search Report cited in Application No. 11747912.1 dated Dec. 5, 2014.
European Search Report cited in Application No. 11747913.9 dated Dec. 5, 2014.
Office Action dated Nov. 7, 2014, in co-pending U.S. Appl. No. 12/969,170.
Office Action dated Jan. 9, 2015, in co-pending U.S. Appl. No. 12/969,397.
"Notice of Allowance Issued in Chinese Patent Application No. 201180010593.4", dated Jun. 30, 2015, 6 Pages.
Office Action dated Apr. 23, 2015, in co-pending U.S. Appl. No. 12/969/170, 33 pgs.
Chinese Second Office Action Issued in Patent Application No. 201180010461.1, dated Sep. 28, 2015, 17 Pages.
Chinese Final Office Action Issued in Patent Application No. 201180010461.1, dated Apr. 4, 2016, Pages.
U.S. Office Action dated Apr. 4, 2016, in co-pending U.S. Appl. No. 12/969,170.
Canadian Office Action in Application 2788282, dated Feb. 27, 2017, 5 pgs.
Chinese Notice of Allowance in Application 201180010461.1, dated Feb. 28, 2017, 4 pgs.
U.S. Appl. No. 12/969,170, Office Action dated Jan. 31, 2017, 28 pgs.
U.S. Appl. No. 12/969,397, Advisory Action dated Nov. 13, 2014, 3 pgs.
U.S. Appl. No. 12/969,397, Office Action dated Jul. 18, 2014, 16 pgs.
European Office Action in Application No. 11747912.1, dated Mar. 31, 2017, 9 pgs.
Third Office Action and Search Report Issued in Chinese Patent Application No. 201180010461.1, dated Oct. 8, 2016, 10 Pages.

* cited by examiner

FIG 14

WEB-BASED VISUAL REPRESENTATION OF A STRUCTURED DATA SOLUTION

CROSS REFERENCE TO RELATED APPLICATIONS

This application claims benefit under 35 U.S.C. §119(e) of U.S. Provisional Patent application Ser. No. 61/307,054 titled "Sites" and filed on Feb. 23, 2010, and is related to U.S. patent application Ser. No. 12/969,170, titled "Data Binding For A Web-Based Visual Representation Of A Structured Data Solution," filed on Dec. 15, 2010, and U.S. patent application Ser. No. 12/969,397, titled "Presentation Of A Web-Based Visual Representation Of A Structured Data Solution," filed on Dec. 15, 2010, the entirety of each of which is incorporated by reference herein.

BACKGROUND

Small and large businesses, educational systems, leisure systems and many other entities often operate computer-based information management systems that integrate many types of data across many facets of operation, such as, business planning, marketing and sales, manufacturing, inventory control, finance, human resources, student records management, faculty and personnel management, and the like. Such entities typically have to communicate with a variety of other entities, including sending, receiving and processing data. For example, a manufacturing business may need to communicate and pass data to and from vendors, customers, professional services organizations, and the like. In order to pass data and information to and from such disparate entities, such a business or entity often must develop and operate an elaborate operation of communications personnel, data processors and computing systems for sending, receiving, entry and processing of such information that is important to the operation of the business or entity.

Enterprise resource planning (ERP) is a business management system that integrates multiple facets of a business. Many businesses utilize an integrated computer-based system to implement ERP in business activities such as inventory control, order tracking, customer service, finance, and human resources, and the like. While ERP software systems are becoming an integral part of how many businesses and organizations conduct business, current ERP software systems do not provide a way for ERP software systems users to connect with potential or existing customers, partners and vendors from within the application.

It is with respect to these and other considerations the present invention has been made.

SUMMARY

Embodiments of the present invention solve the above and other problems by enabling a user of a business application (herein referred to as a business application user) to connect with an end user using a web page to display information published from the business application and associated data repositories and to collect information and make it available for download into the business application. A structured data solution in the form of a grouping of metadata, referred to as a solution, defines data, data presentation, and data binding for enabling a scenario. An example solution scenario may include a web page for allowing an end user to enter purchase order data for use by a manufacturing business sales function. The data may describe types of entities that may be published from the business application. The presentation metadata may define templates that describe a layout, theme, and controls that may be displayed in a page. The presentation metadata may also define how pages may be linked together to form a series of connected solution scenarios. The binding metadata may define the association of data to controls. At run time, the metadata may ensure that web-based structured data solutions in the form of web pages displayed to an end user conform to relationships and constraints established by a structured solution file.

According to embodiments, the business application user-entered data, the data controlling the presentation of the data, and the data associated with binding business application user-entered data to the presentation of the web-based structured data solution (web page) may be utilized for receiving end user-entered data from the web page and for publishing the received end user-entered data back into the business application. The storage metadata, presentation metadata, and the binding metadata may all be structured in a way that allows a business or organization to efficiently utilize the data received through the web-based solution. The web-based structured data solutions may be enabled through data binding between business applications and associated data repositories and web-based structured data solutions (web pages/sites). Data binding allows establishing relationships between the business application and associated data repositories (e.g., ERP system). Web-based structured data solutions may be presented as web pages or sites based on the roles of end users accessing the web pages or sites. That is, the presentation of the web pages or sites for allowing end user interaction with the business applications and associated data may be tailored to the roles of the end users (e.g., salespersons, purchasers, human resources managers, etc.).

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 14 is an illustration of a UI within a business application system showing statuses of various solution scenarios.

DETAILED DESCRIPTION

Figure 1:
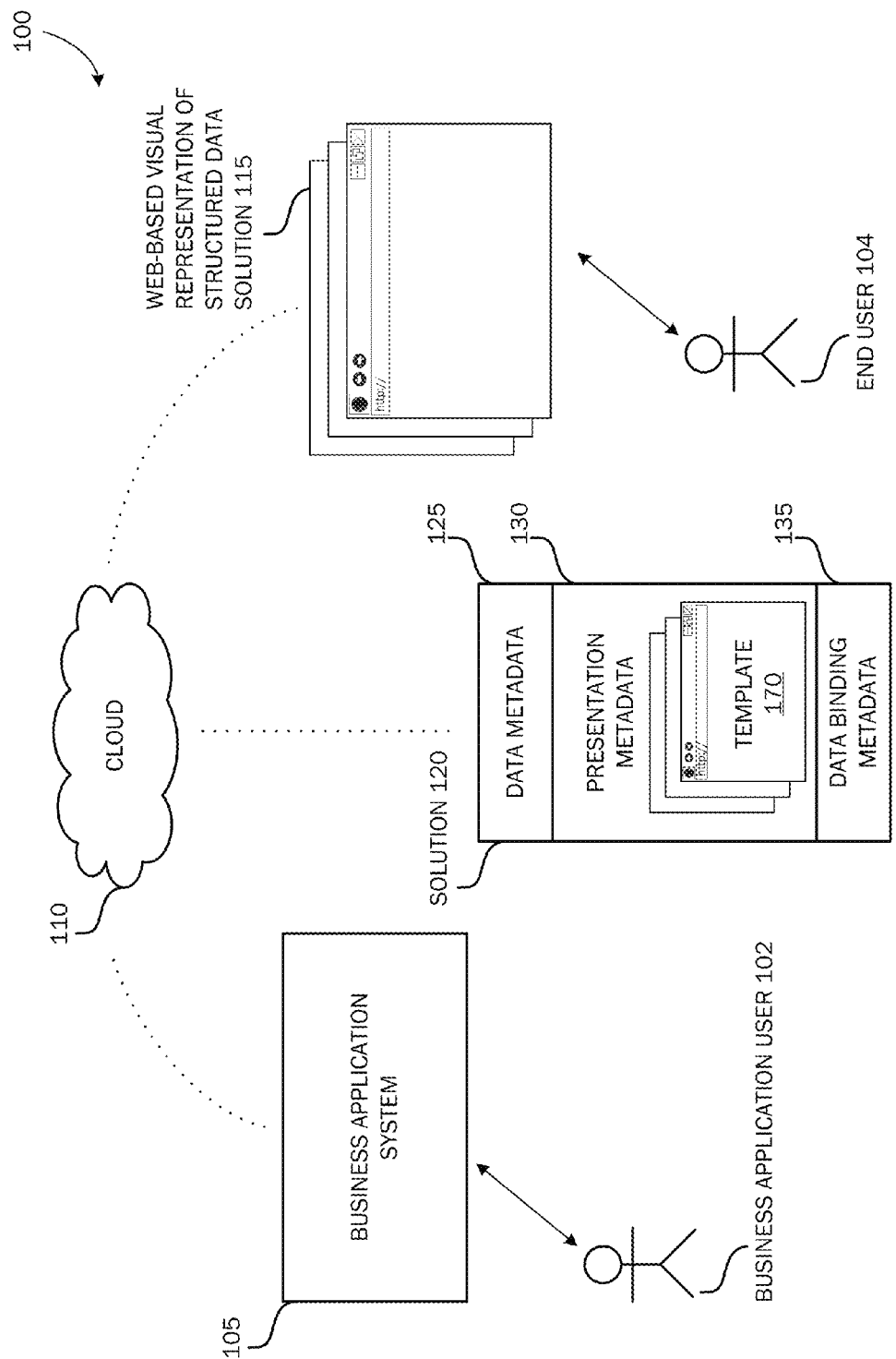
FIG. 1 is a simplified block diagram of a system architecture for generating, binding, publishing, and synchronizing a web-based structured data solution with a business application system.

Embodiments of the present invention solve the above and other problems by providing for information connection between businesses or other entities and their customers, vendors or other information exchange partners. Connection between business applications and associated data repositories operated by the businesses or other entities and their customers, vendors and other information exchange partners is provided through web pages bound to the business applications and associated data repositories via a distributed computing and communications system (also known as the "cloud"). For example, a web page may be published with data entry fields that are bound back to a manufacturing company data management application that allows a vendor of the manufacturing company to enter raw material supply data into the web page so that the entered supply data is passed directly back to the manufacturing company's data management application without the need for the manufacturing company to utilize data entry personnel or to write specialized data management code for the example data exchange. In addition to exchange of data between the entities, information helpful to the relationship between the entities may also be exchanged such as advertising information, contact information, help content and the like.

According to one embodiment, a transformation of metadata from a business application and associated data repository and a visual representation in the form of a published web page allows for a receiving of data collected via the published web page, and a transformation of received data back into a format for synchronization with the business application and associated data repository. Templates may be provided for creating and managing web pages and web sites within a business application system (e.g., ERP system). A business application user may create such pages or sites as a landing page for a marketing campaign, a dedicated request for quote site to receive quotes from business partners, a page or site for product registration information and customer feedback, a page or site for human resources information for job recruiting and/or pages or sites for communicating and connecting with community or other end users.

Information from a business application system, such as an ERP system, may be published to a business application user-generated web page for display to an end user, and for collecting information from an end user to make available for download into the business application system. The user-generated web page may be defined as a web-based structured data solution, which may define data, web page presentation, and data binding metadata for enabling a given solution scenario. An example solution scenario may include a web page for allowing an end user to enter purchase order data for use by a manufacturing business sales function. The data, web page presentation, and data binding metadata may be structured in a way that allows an organization to efficiently utilize information received through the web-based structured data solution.

A business application user may enable a connected scenario on the web without information technology (IT) dependency. That is, the web-based structured data solutions may be created without the user having to write code. Business application users may connect with potential and existing customers, partners, and vendors from within the business application system and may capture interactions directly into the business application system.

According to another embodiment, the web-based structured data solutions may be enabled through data binding between business applications and associated data repositories and web-based structured data solutions (web pages/sites). Data binding allows establishing relationships between the business application and associated data repositories (e.g., ERP system) and corresponding data objects or fields in the web-based structured data solution. Data binding can be grouped into both instance binding and metadata binding. Instance binding involves binding the web page to data associated with the business application dynamically as data associated with the business application is created or changed. Metadata binding establishes a set of relationships that dictates the behavior of the instance binding. Metadata binding thus is targeted to the solution developers, while the instance binding is targeted to the end users of the business application. According to embodiments, data binding also enables a synchronization interface for maintaining binding between two disparate systems.

According to another embodiment, web-based structured data solutions may be presented as web pages or sites based on the roles of end users accessing the web pages or sites. That is, the presentation of the web pages or sites for allowing end user interaction with the business applications and associated data may be tailored to the roles of the end users (e.g., salespersons, purchasers, human resources managers, etc.). Business application (e.g., ERP systems) users often work with data intensive user interfaces, and the information that they collect from their vendors/suppliers or other partners may be a subset of the data that they typically work with. As a result, the business application user needs flexibility with respect to defining what data to display and how to display the data to their customers, vendors, partners or the like. Thus, users have complete control over the data to be displayed and the presentation of the data to their end users. This enables information to be displayed and presented in a format that is tailored to the end user.

For purposes of illustration, consider an example business desiring to publish a web-based page for allowing individuals to apply for a position within the business. The organization may have data within its business application system (e.g., ERP system) associated with the specified position, such as a job title, job description, minimum qualifications, etc. According to an embodiment of the present invention, a solution, such as a web-based employment application, may be constructed by a business application user, such as a human resources (HR) agent of the organization. Selected data within the business application system may be bound to the solution, such that when the employment application web page(s) is/are published, the selected data from the business application system may be presented. Potential applicants may access the web-based employment application, view the published selected data from the business application system, and may apply for the specified position online. The web-based job application may be comprised of a web-based presentation that may have fields for allowing an applicant to enter specified data, such as his/her name, address, phone number, qualifications, years of experience, attach a resume, etc. The web-based job application may have a variety of images or other company information, such as a company logo, information about the company, a link to the company's website, etc., that may be of value to an applicant. Additionally, the web-based job application may have various selectable functionality controls for allowing potential applicants to submit entered data back to the organization or for otherwise manipulating entered data. As should be appreciated, the foregoing example is but one of a vast number of solutions for which embodiments of the present invention may be utilized.

The following description refers to the accompanying drawings. Whenever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Referring now to the drawings, in which like numerals represent like elements through the several figures, aspects of the present invention and the exemplary operating environment will be described. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a simplified block diagram of a system architecture within which embodiments of the present invention may be implemented. Referring now to FIG. 1, a business application 105 is illustrated. Many organizations and businesses integrate multiple facets of their organization/business into a single computer-based system, such as an enterprise resource planning (ERP) system. An organization/business may utilize an ERP system for various business activities across the various workloads of a business (e.g., manufacturing, supply chain management, financials, procurement, project management, human resources, customer relationship management, data services, access control, as well as other business activities, etc.). For example, a business application 105, such as an ERP system, may consolidate business operations of an organization/business, such as manufacturing, supply chain management, financial systems/data, project management, human resources, customer relationship management, data services, and access control, into a uniform and enterprise-wide system environment. A business application 105, such as an ERP system, may reside on a centralized server, or may be distributed across remote processing devices that are linked through a communications network.

Organizations and businesses may connect with customers and/or other remote entities over a distributed computing and communications network/system, such as the Internet and/or via one or more third party hosted services. Such third party hosted services are referred to herein as the "cloud" 110. The cloud 110 may be generally described as a set of services and technologies that enable a delivery of computing services over the Internet. An example of a cloud services operating system is WINDOWS AZURE by MICROSOFT CORPORATION of Redmond, Wash. Business applications 105 may be extended from on-premise to the cloud 110. Oftentimes in the course of doing business, there may be various logical processes in which communication with other entities, such as other people, companies, organizations, as well as information data interchange networks, etc., is necessary. Some of the logical processes may start within a business application 105, but may end in the cloud 110 or may be communicated through the cloud.

E-commerce is an example of a transaction that may go through one or more intermediate companies in the cloud 110 to be completed. For example, a merchant may showcase a product intended to be sold on a website. A customer may visit the website, choose the product, and add the product to a shopping cart. A connection to a transaction server may be made, wherein the customer may give credit card or other payment information to purchase the product. The merchant's transaction server may connect with a third party credit card processing server to check if the customer has sufficient funds to pay for the purchased product. The transaction may be transparent to the end customer who only knows that his/her transaction has taken place. Each of the various transactions, processing steps and data storage actions may take place at one or more remote sites together or remote from each other where the collection of the remote computing activities may be referred to as existing and/or operating in the "cloud."

Embodiments of the present invention provide for business application users 102 to enable connected solution scenarios on the web that do not require IT dependency. Examples of types of solution scenarios that may be enabled include, but are not limited to, vendor enrollment, sourcing, time entry, job listings, vendor managed inventory, sales lead data capture, purchase order/invoicing, service contract renewal, and customer support requests. The connected solution scenarios may enable business application users 102 to connect, share, and capture business information from customers, vendors, and partners. Connection and sharing may be accomplished by creation and publication of web-based visual representations of a structured data solution (hereafter "web pages") 115 that publicly expose information stored and utilized by an organization and made available via a business application 105. This may be done by transforming metadata from a business application 105 to a visual representation (web page 115) of a structured data solution 120 on the cloud 110. Information may then be captured via the web-based visual representation 115 of the structured data solution 120, and made subsequently available within the business application 105 for immediate processing and follow ups. Referring again to the example described above of an online job application, the published visual representation of the structured data solution (web page) 115 would be the job application web page.

According to embodiments, metadata may be required to enable a solution scenario, such as an online job application. A structured grouping of metadata required for a solution scenario may be referred to as a solution 120. A solution 120 may be generally described as a packaging of declarative constructs, encompassing metadata, data, and visual elements. As a declarative statement, a solution 120 may declare a consummation of metadata, a binding of the metadata to a visual element 115, and how the data is presented as well as brought back into a business application system 105. A solution 120 may be comprised of data metadata 125, which is a structured description of the types of entities that may be published. A solution 120 also may be comprised of presentation metadata 130, which may be a structured description of the presentation of the data 125 in the form of the web page 115 and may address how information may appear visually and contextually.

In addition, the solution 120 also may be comprised of data binding metadata 135 which may allow for establishing relationships between a business application system 105 (and associated data repositories) and associated data and functionalities presented in a web page 115 via the cloud 110. Data binding 135 may include instance binding and metadata binding. While instance binding involves binding a web page 115 to business application data dynamically as data is created and/or changed, metadata binding may establish a set of relationships that may dictate the behavior of instance binding. Metadata binding may be described as the transformation of metadata from a business application 105 to a web page 115 via the cloud 110, which may be described declaratively through a solution 120. The data binding metadata 135 may declare not only how data is presented to an end user 104, but also how data is brought back into a business application system 105.

Figure 2:
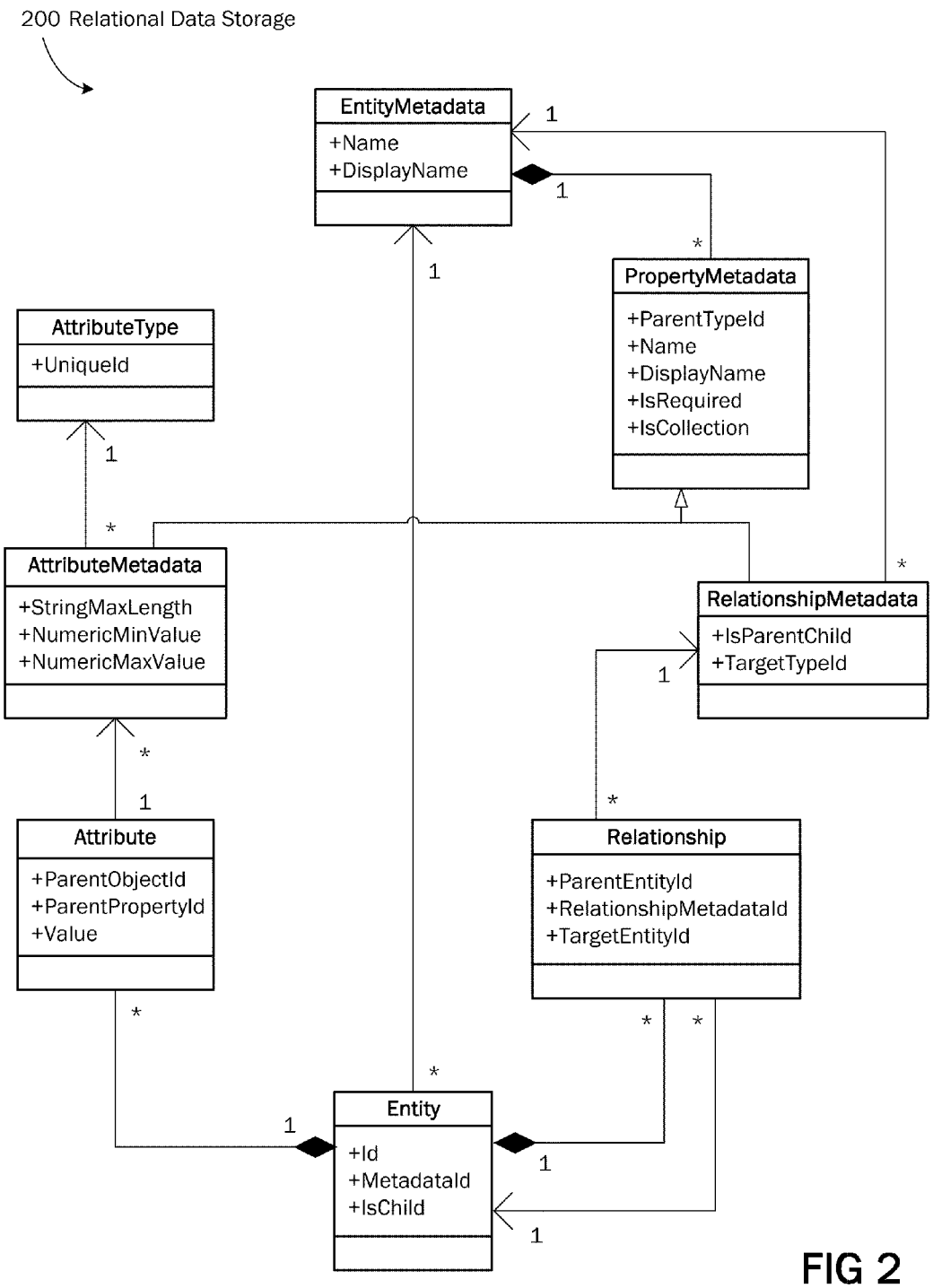
FIG. 2 is a data model of relational data storage.

According to embodiments, a generic framework may be utilized to implement model-based applications on the cloud, which may satisfy three primary requirements of a business application using abstract models, including relational data storage, data presentation workflow, and data synchronization with other systems 105 (e.g. backend ERP system). Each model may be described using declarative metadata structures (e.g., representational XML), wherein the metadata may be organized in layers in the form of self-contained packages, referred to as a solution 120. As illustrated in FIG. 2, the relational data storage may be expressed as an entity relationship (ER) model based on entities and relationships, wherein certain business logic semantics may be expressed through implicit structural constraints (e.g., attribute constraint and first-order relational constraint). The relational data storage model may provide for storage and retrieval of binary large objects (BLOBs), which may be used for storing documents and images. The relational data storage model may support variable length collections in attributes and relationships.

Figure 3:
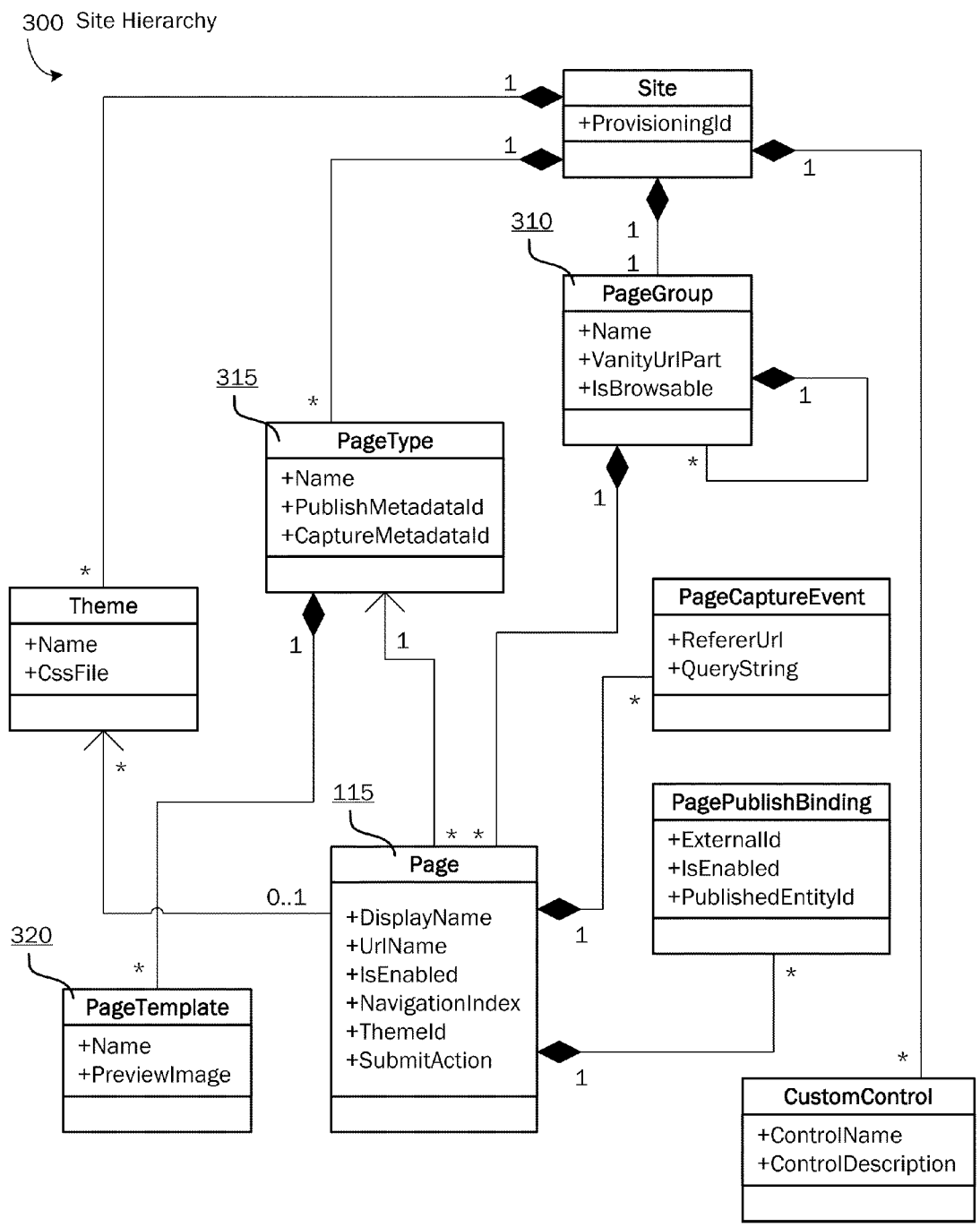
FIG. 3 is a data model of site hierarchy.

According to embodiments, the data presentation workflow 130 may address what information may be presented to an end user, as well as how the information appears visually and contextually. Data presentation 130 may be comprised of four sub-areas: layout, data-binding 135, workflow, and site hierarchy. As illustrated in FIG. 3, site hierarchy may address how information is organized within a context of various business flows, and may be broken into four concepts: web page 115, page group, page type, and page template 170. According to embodiments, a web page 115 is a browsable endpoint that may display pre-determined information and that may be used to collect inputs from an end user 104.

Web pages 115 are the leaves in the site hierarchy 300. A page group 310 is a specific grouping of pages 115 which, gives some contextual semantic to the collection. Page groups 310 may be part of other page groups, allowing a nested hierarchical structure. For example, page groups 310 may be different business flow areas (e.g., procurement, marketing, etc.). A page type 315 is another grouping of pages 115 based on web page behavior canonicalization or standardization where data that may have more than one possible visual representation may be standardized to on page type 315. Page types 315 may define a general presentation behavior (e.g., a Sales Lead Capture page or a Contact Us page) and thus enforce certain design constraints. Each web page 115 may belong to one and only one page type 315, and thus conforms to the constraints of the type. A page template 170 is a starting point for creating a web page 115. Page templates 170 may define the same presentation behavior as the web page 115; however, they are not browsable endpoints, and may only be used while creating a new page.

Figure 4:
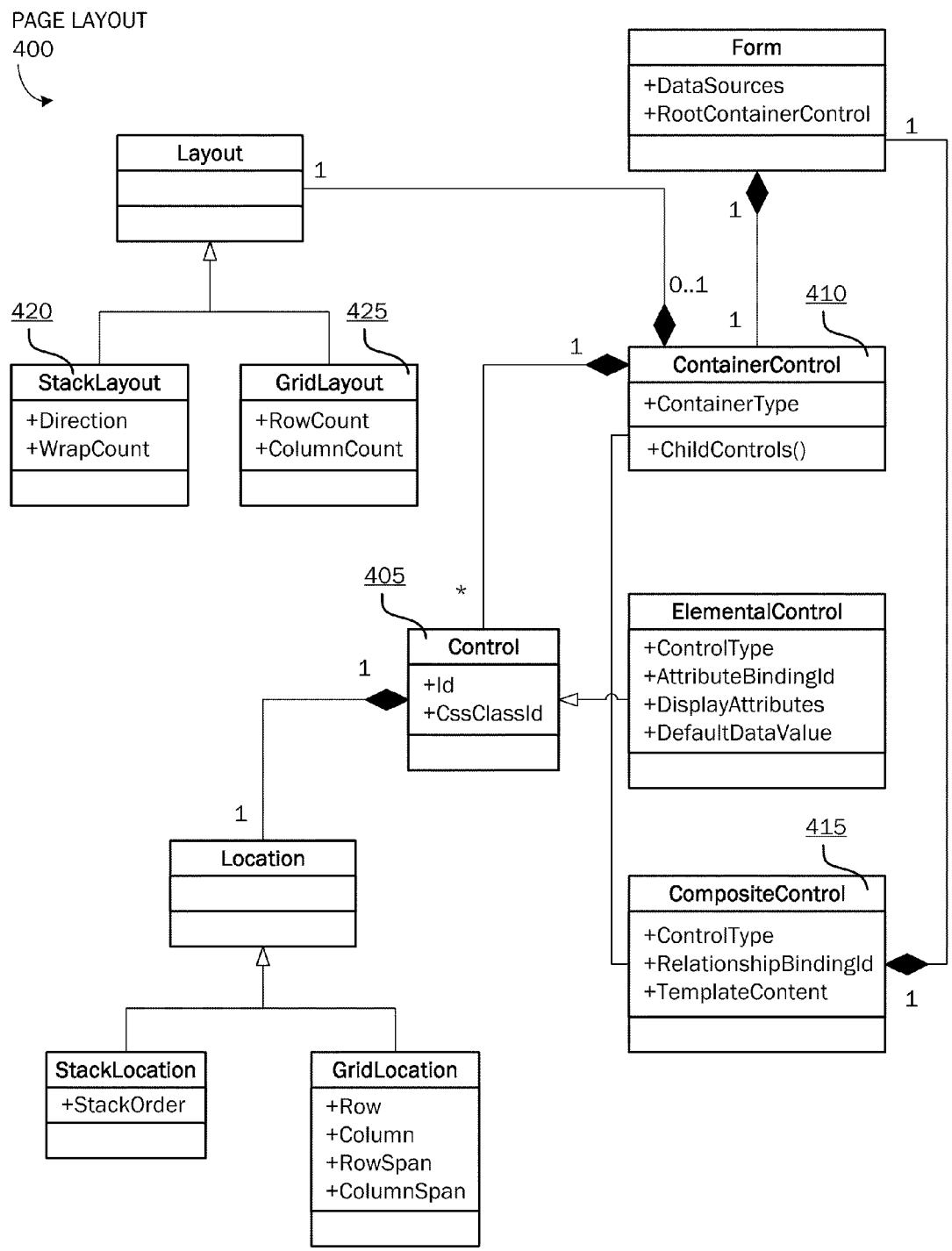
FIG. 4 is a data model of page layout.

Referring now to FIG. 4, the page layout 400 addresses how data is presented inside a web page 115, and may be defined by three building blocks: controls, container controls, and composite controls. A control 405 is a presentation entity with specific rendering and user-interaction behavior (e.g., textbox, labels, dropdowns, etc.). A container control 410 is an organized collection of child controls with various layouts, and a composite control 415 is a reusable presentation segment (e.g., address block). The page layout 400 may support nested containers, stack layouts 420 and grid layouts 425, and theme-based styling.

Figure 5:
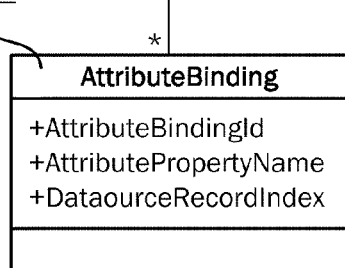
FIG. 5 is a data model of page data binding.
Figure 5:
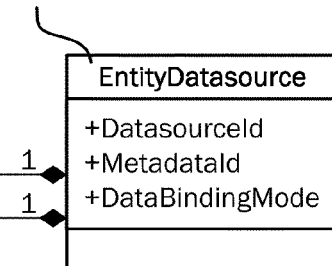
Figure 5:
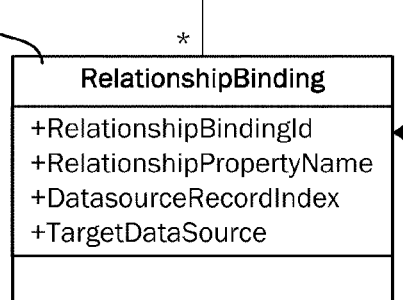

Referring now to FIG. 5, page data binding 135 may address what data is presented inside a web page 115, and may be described in terms of entity data source(s) 505, attribute binding 510, and relationship binding 515. The entity data source 505 is a page-design-time abstraction of the entity record that the web page 115 will be bound to at run-time. A web page 115 may have more than one data source, and may form an acyclic graph through the relationships. A data binding graph 135 may conform to the defined entity metadata structure. Attribute binding 510 may establish a linkage between the controls 505 and the nodes in the data source graph. Attribute binding 510 may specify which properties of a bound record to be displayed and captured in a control 505. Relationship binding 515 is a relational edge between two data source nodes in the data binding graph 135. Relationship binding 515 may define how bound records are related with each other. A data binding engine may load the binding graph 135 dynamically when the web page 115 renders in a specific binding context, and the modified part of the graph (i.e., the records) may be committed back into the database upon user submission.

Figure 6A:
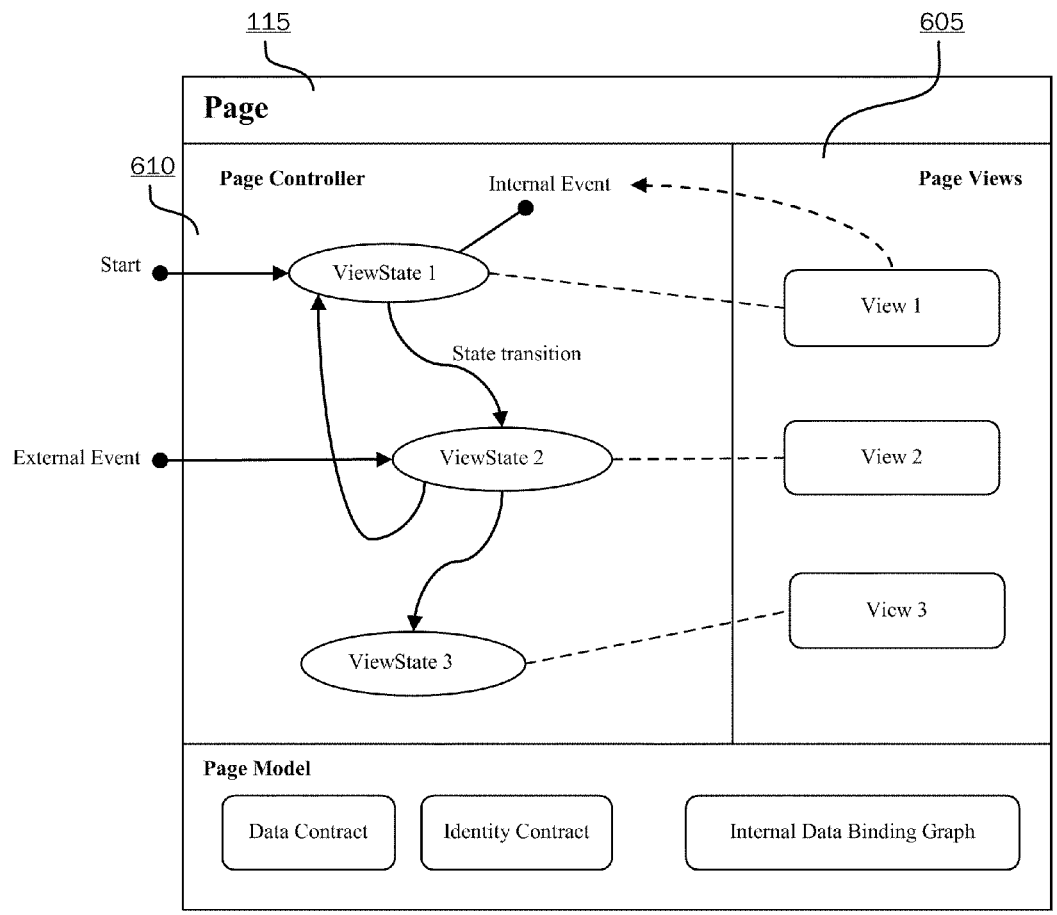
FIG. 6A is simplified block diagram illustrating page workflow.

A workflow is a chain of presentation states and the controller logic governing transitions between the states. Workflows may be described using declarative structures. Workflows may be exposed in two levels of complexity with shared knowledge from one to the other. A simple form of a workflow is illustrated in FIG. 6A, and may be contained inside a single web page 115. A web page 115 may have one or more presentation states called views 605. Each view 605 may be defined using the layout 500 and data binding 135 structures described above. A view 605 may describe how a web page 115 looks and what data is shown in a particular web page state. The page controller 610 is the workflow inside the web page 115, and may define a chaining of views 605 using an event-driven and/or rule-based transition model.

Figure 6B:
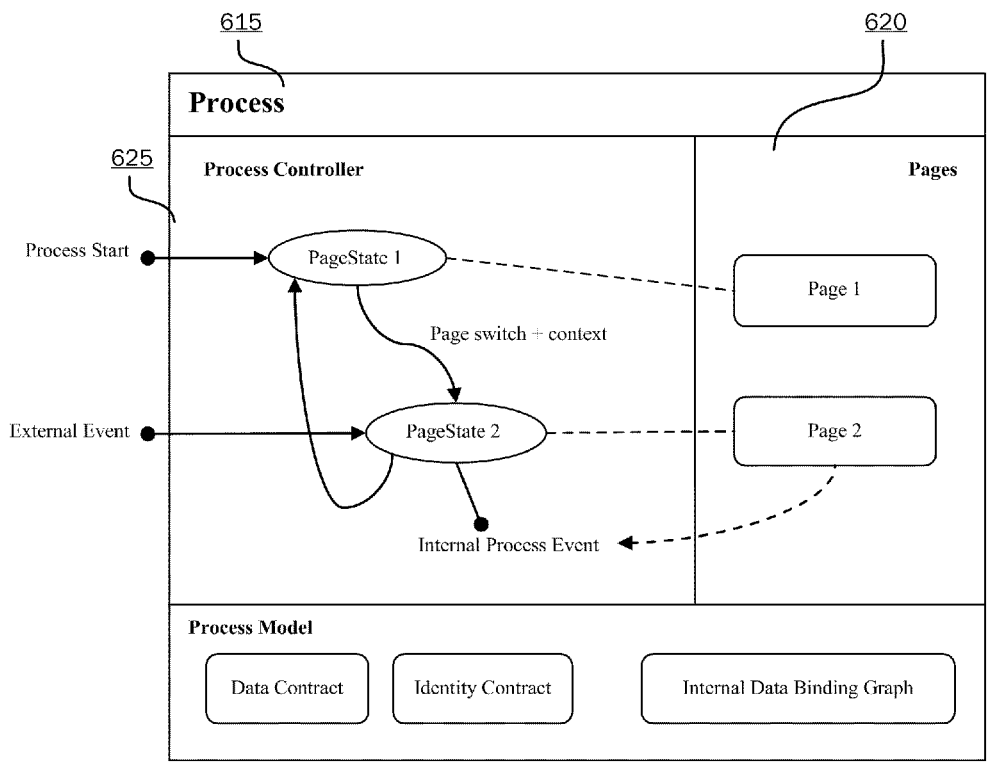
FIG. 6B is simplified block diagram illustrating process workflow.

As illustrated in FIG. 6B, a higher level and more powerful workflow is illustrated as a process 615. A process 615 may be composed of pages 115 chained in a similar way as views 605 in the respective web pages 115 (i.e., rule-based or event-driven). A process controller 625 is a chaining logic in the process 615, and may enable advanced solution scenarios, such as master-details navigation, portals (hub-like navigation to multiple pages), etc.

Both page and process controllers 610,625 may expose many internal and/or external events in each state. Process internal events may be bound by components inside the process 615 (e.g., process controller 625, page views 605, page controllers 610, etc.). Page internal events may similarly be bound by the components inside the web page 115. External events may be bound to the outside of the process 615 or web page 115. For example, an external event may be bound to a communication channel (e.g., Service Bus) to be triggered when a remote calculation completes and the results are made available.

Embodiments of the present invention may provide for a data synchronization model, wherein every storage entity record may have an auto-generated version number, and any change to the record may increment the version number. The synchronization model may be change list-based, wherein a list of all changes from a specified marker version number may be provided. The model may be type-agnostic, wherein the change list uses the metadata structure to describe the changes to the entities. Synchronization behaviors or contracts (e.g., frequency, record selection filter, etc.) may be described to connected clients through synchronization policies. A client may be required to adhere to the synchronization policies while performing a synchronization operation with the platform of the present invention.

According to embodiments, bidirectional data synchronization is provided and includes conflict detection and resolution in order to keep the backend data in the business application 105 (e.g., ERP system) and the web page 115 published via the cloud 110 in synchronization. When data is modified in the business application 105, it may be automatically received by a synchronization channel and may be pushed out to the cloud 110 and solution 120 for synchronizing the modified data with the web page 115. In the reverse, when data is modified at the solution 120 or web page 115, the modified data may be automatically received by a synchronization channel for synchronizing the modified data with the business application 105. When the same data element is modified both in the business application 105 and the solution 120 or web page 115, a conflict may result because it may not be possible to determine which of the business application or solution 120 or web page 115 is the master source for determining which modification should control, and thus, a conflict may result. In some cases (e.g., for certain data-types) a user 102, 104 may cause automatic resolution by establishing one of the sides as a master source of the conflicting modifications and automatically resolving the conflict according to the data modification made to the established master source. In other cases, the user may check a synchronization log and resolve the conflicts manually by merging data from both sides appropriately. As should be appreciated, change tracking at both sides may be performed for comparing versions of data at each side and for performing the conflict detection and resolution described herein. In addition, users at both ends of the system, including developers of the solution 120, may be automatically notified of modifications and/or polled for input as to change or conflict resolution.

According to embodiments, a metadata-driven application model may be exposed. As can be appreciated, as application solution scenarios may become complicated, the metadata may be large. Oftentimes, solution scenarios may be developed by various providers, but may be installed together to work as a single end-to-end solution. Accordingly, embodiments provide for a way to package metadata into solutions 120. A solution package 120 may include an identity, a public contract, and metadata. A solution 120 may have a valid identification, including a name, unique identifier, version, provider name, optional public key, and optional description.

A public contract may describe how a solution interacts with other components (e.g., other solutions) in a system. A public contract may include a schema contract, which may describe what other entity metadata may be required in a data-storage model in order to make a solution functional. The schema-contracts from other installed solutions 120 may be combined by the platform, and may be propagated to the synchronization interfaces. A solution public contract may also include a dependency contract, which may describe other solutions 120 that the particular solution is referencing. A solution 120 may be disabled if a current state of a system does not satisfy its public contract. The metadata component may contain all the metadata structures defining the presentation components (e.g., site hierarchy 300, page templates 170, workflows, etc.) and behavior of a solution 120. The metadata may be required to adhere to a public contract as previously declared by a solution. A solution 120 may be digitally singed by a public key infrastructure (PKI)-based certificate to avoid tampering and to preserve integrity. If a solution 120 is signed, the identity of the solution may be required to include a public key of a signer certificate.

As described above, embodiments provide for a data binding abstraction platform, wherein data from a business application system 105 may be transformed into a format utilizing a structured definition, such as an extensible markup language (XML) data structure. An XML binding schema may interpret the data in terms of presenting the data to an end user 104, so that data may be transformed from a business application system 105 to a visual representation 115 on the cloud. As should be appreciated, XML is just one way of representing the transformation of data and metadata between a business application system 105 and the cloud 110. The transformation of data allows for binding the data as context, and the transformation of metadata allows for determining the type of data that can be bound for the presentation aspects.

As described above, embodiments of the present invention provide for data entered into a web-based visual representation of a structured data solution 115 to be synchronized back into a business application 105. Data within an organization's business application system 105 may be transformed into a visual representation 115 within which end user-entered data may be received and then correspondingly transformed into a format so that the end user-entered data may be synchronized with the business application system and utilized as needed. Data binding metadata 135 may define directional binding; that is, defining what data may be incoming or outgoing, how a data graph should be populated with data from a business application 105, as well as how populated data on a web page 115 may go back into the data graph.

Figure 7:
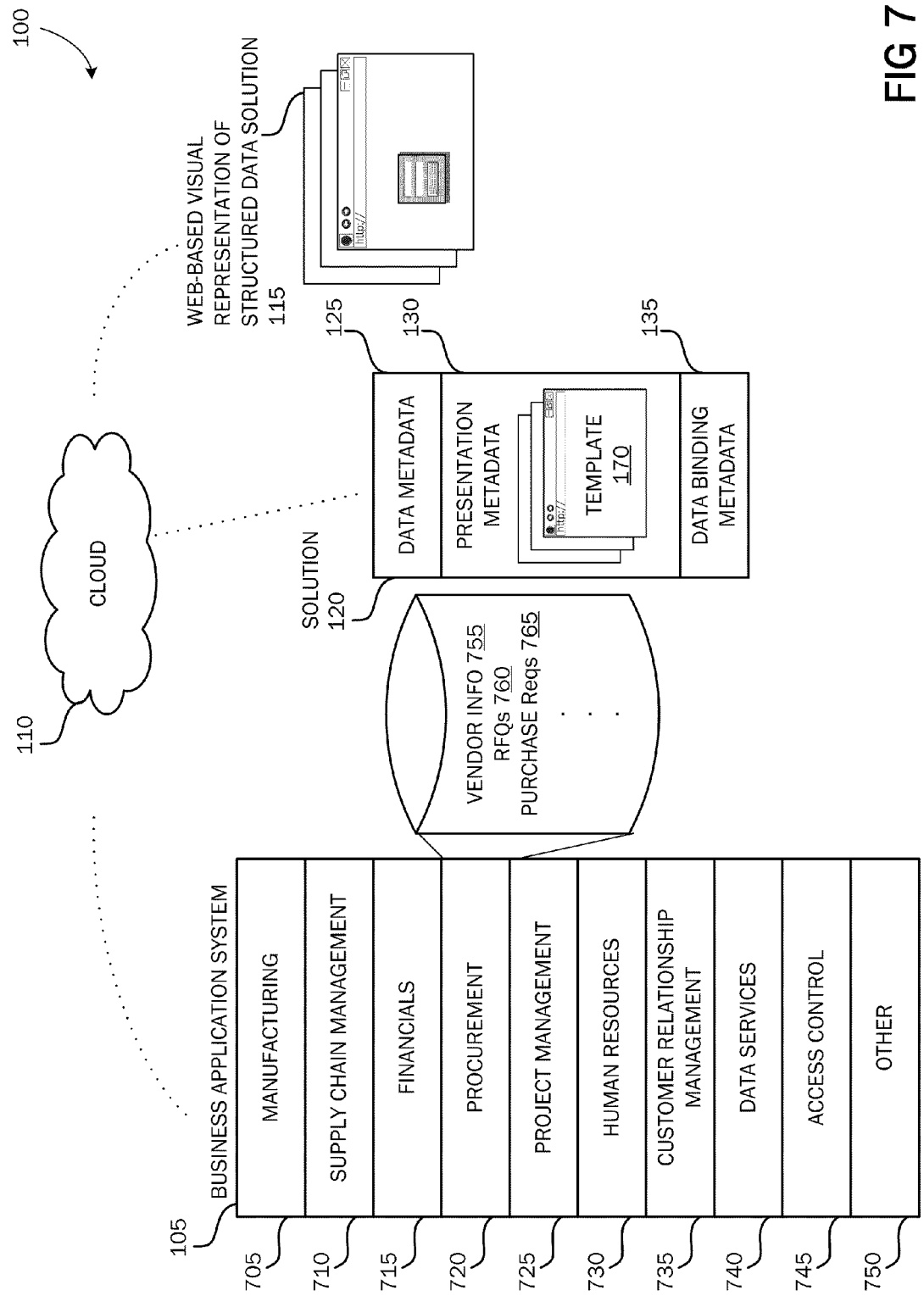
FIG. 7 is a more detailed simplified block diagram of the system architecture of FIG. 1.

Referring now to FIG. 7, various workloads are illustrated within a business application system 105, such as an ERP system. A workload may be a facet or operation of a business, such as, but not limited to, manufacturing 705, supply chain management 710, financials 715, procurement 720, project management 725, human resources 730, customer relationship management 735, data services 740, access control 745, as well as other business activities 750. Within each workload 705, 710, 715, 720, 725, 730, 735, 740, 745, 750 various information may be stored. As should be appreciated the example business workloads are for purposes of example only and are not limiting of the vast number of organization functions or processes that may associated with a web based solution page 115 as described herein.

Figure 8:
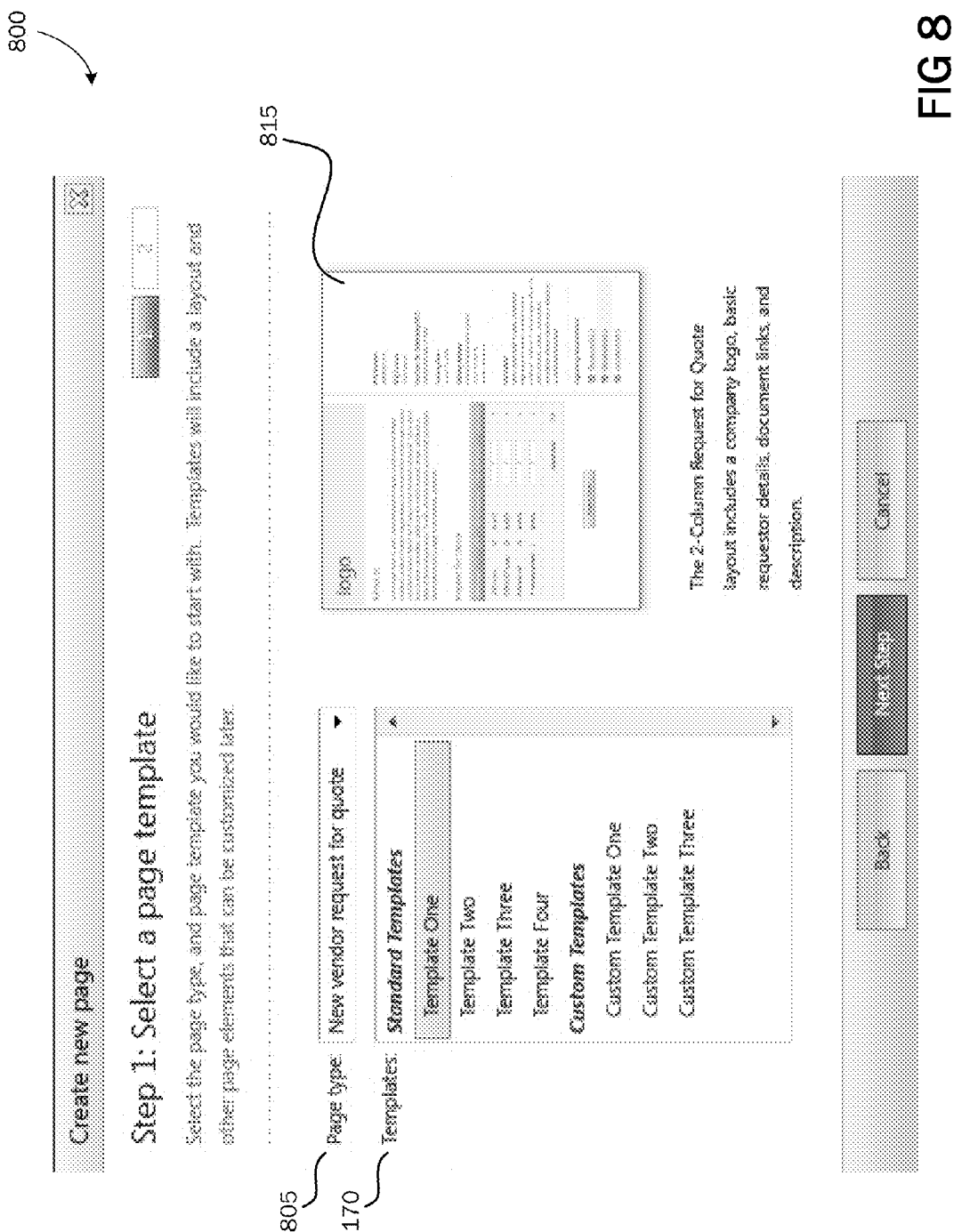
FIG. 8 is an illustration of a UI within which a business application user may select a page template.

For example, a procurement 720 workload may comprise such data such as vendor information 755, request for quotes (RFQs) 760, purchase requisitions 765, etc. A business application user 102, such as a procurement agent, may wish to generate a scenario, where he/she may wish to publish a new RFQ for requests for quotes or proposals from various vendors via an RFQ web page 115. As illustrated in FIG. 8, according to embodiments, various templates 170 may be provided for creating a new page. As illustrated, a preview and description 815 of each provided template 170 may be displayed. A template 170 may be provided by a solution developer such as an independent software vendor (ISV), from a software publisher, or from any user able write code to generate a template. A page template 170 may be utilized as a starting point for creating a web page 115. A page template 170 may define presentation behavior, may display predetermined information, and may collect inputs from an end user 104. Referring back to the example, the procurement agent may select and upload an RFQ template 170 for building a web-based RFQ page.

Figure 9:
FIG. 9 is an illustration of a UI wherein a business application user may enter page details.
Figure 10:
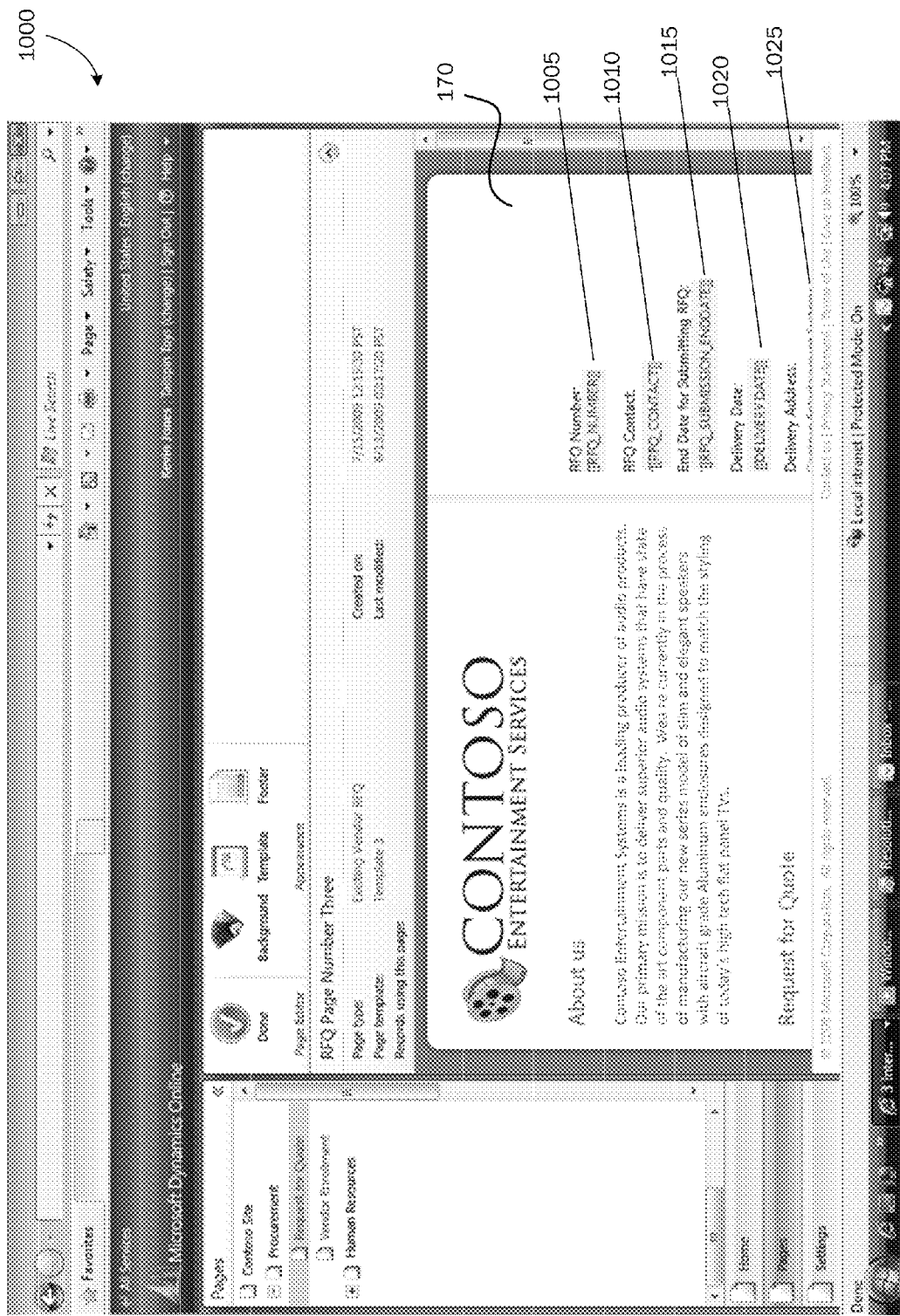
FIG. 10 is an illustration of a page template within which a business application user may enter data and presentation data and bind fields.

As illustrated in FIG. 9, the business application user 102 may be prompted to enter page details, such as a page name 905 and a page URL 910. That is, the user 102 may use page 900, illustrated in FIG. 9, to start the process of building a web page 115 by providing a name and page locator for the web page 115. Referring to FIG. 10, a user interface 1000 may be provided with which a business application user 102 may declare which data associated with a business application 105 to include in the web page and to bind to various data elements within the page. For example, data elements, such as the RFQ number 1005, RFQ contact 1010, RFQ submission end date 1015, delivery date 1020, and delivery address 1025, etc., may be bound to data elements within the business application/system 105.

Declared data bindings may be saved as data binding metadata 135. Data may be transformed using a structured definition of the data (e.g., XML) from the business application system 105 to a visual representation 115 on the cloud 110. As illustrated in FIG. 10, data 125, such as a company logo, information about a company, as well as other data within a company's database, may be bound to a web page 115. Various functionalities may be provided for allowing a business application user 102 to customize the presentation appearance of a web page 115. For example, various backgrounds, headers, footers, colors, or layout choices may be available from which a business application user 102 may select. A business application user 102 may edit data, add additional fields to a template, as well as remove fields. Visual aspects of the page may be saved as presentation metadata 130.

One or more end users (e.g., vendors) 104 to whom the business application user 102 may want to share a web-based visual representation of a structured data solution 115 may be selected or entered. An end user 104 may be an individual or company who may be an existing vendor, customer, applicant, or other entity whose information may already be in the business application 105. Alternatively, a web page 115 may be sent to potential vendors, applicants, customers, or may be published publicly for an undefined end user 104 to access. When a business application user 102 has finished entering the data he/she wants included on the page, selecting fields in the business application 105 to which he/she would like to be bound to fields in the page, customizing the appearance of the page, and selecting or entering to whom he/she would like to send the visual representation 115, the solution 120 may published to the cloud 110.

Figure 11:
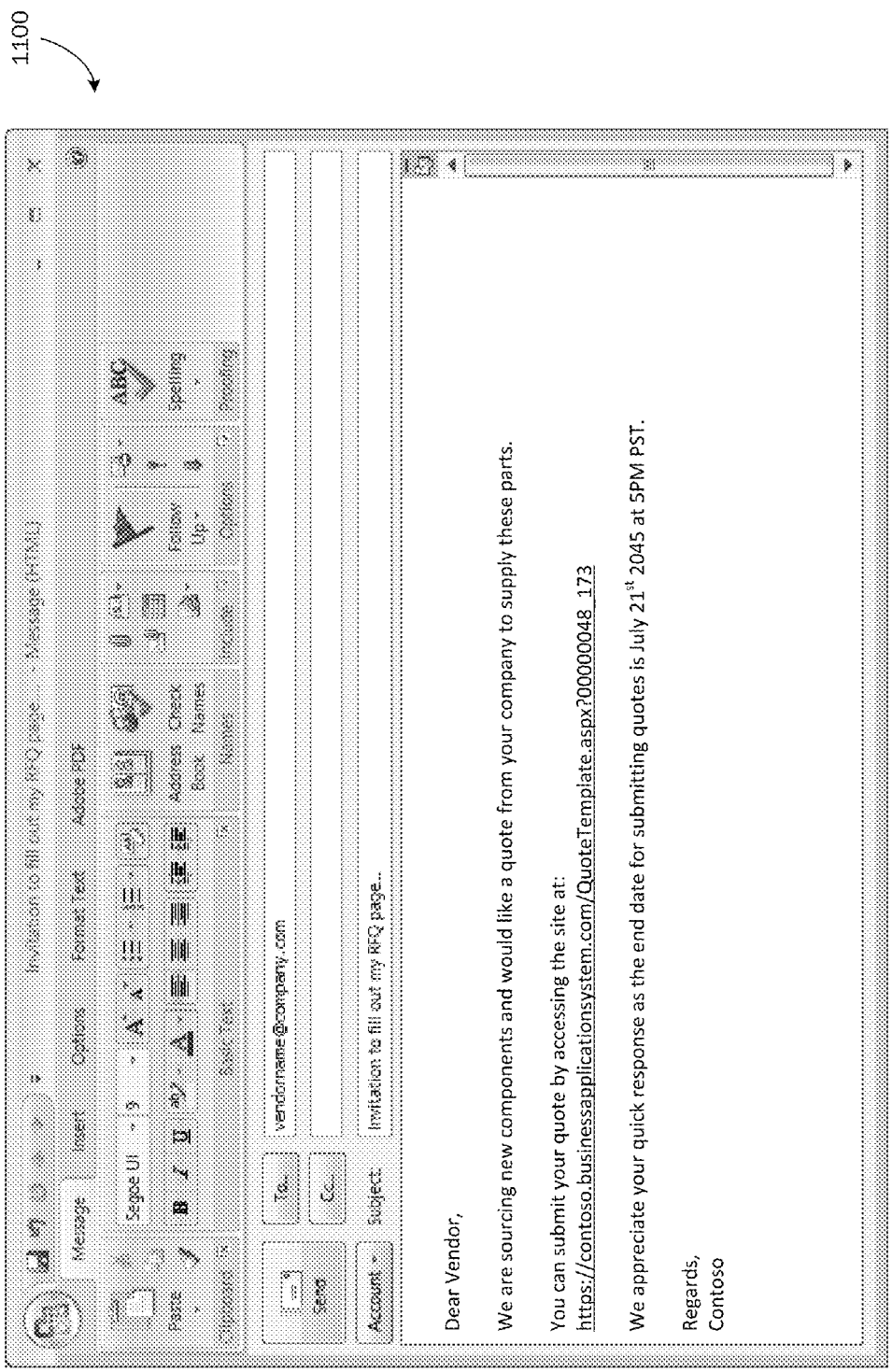
FIG. 11 is an illustration of an email containing a link to a business application user-created web-based structured data solution.

According to embodiments, a URL to the web page 115 may be generated, wherein end users 104 may access the web-based visual representation of the structured data solution (web page 115). As illustrated in FIG. 11, a message (e.g., email) 1100 may be sent to an end user 104, which may contain a link 1105 to the visual representation 115.

Figure 12:
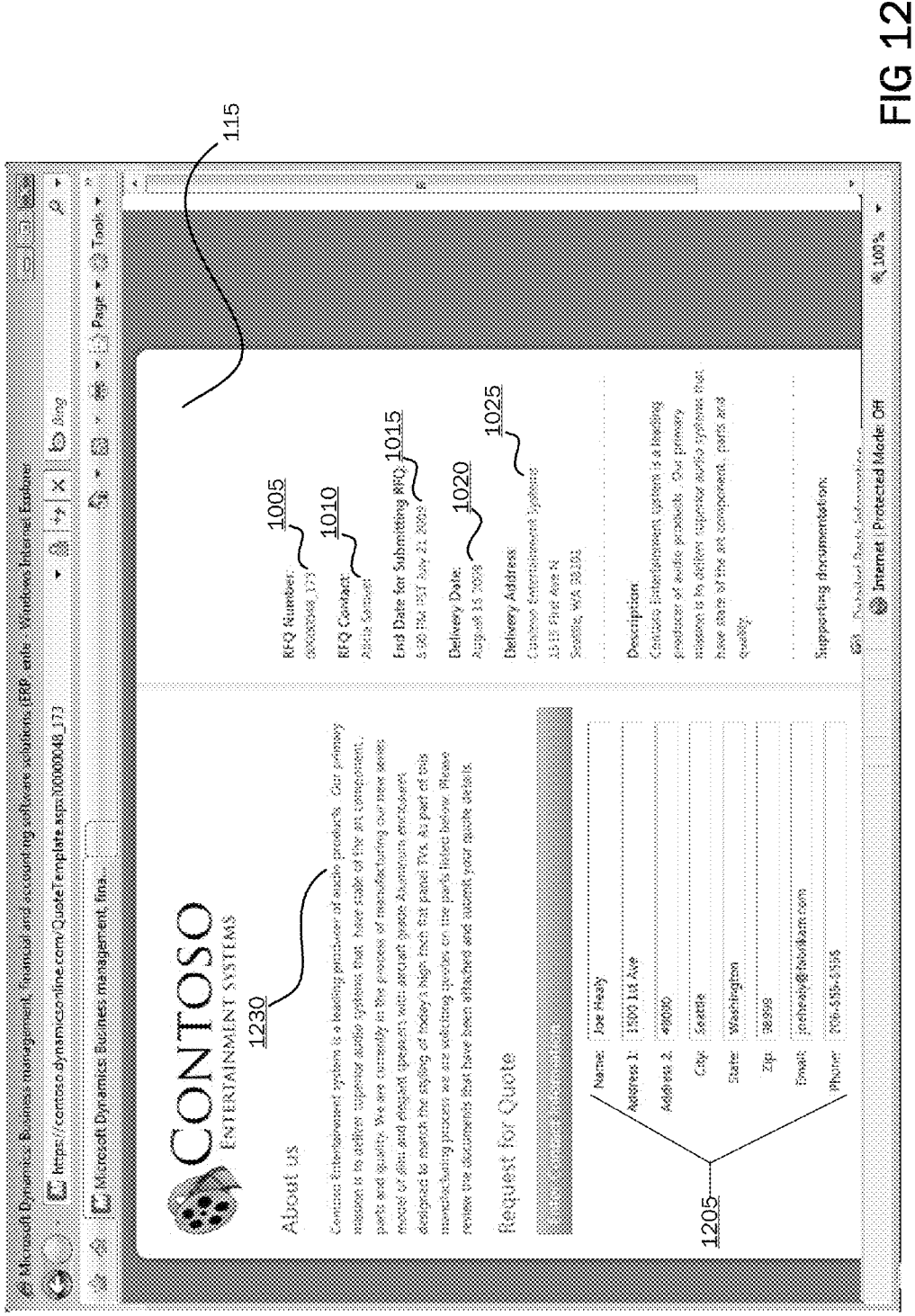
FIG. 12 is an illustration of a page of a published web-based structured data solution.
Figure 13:
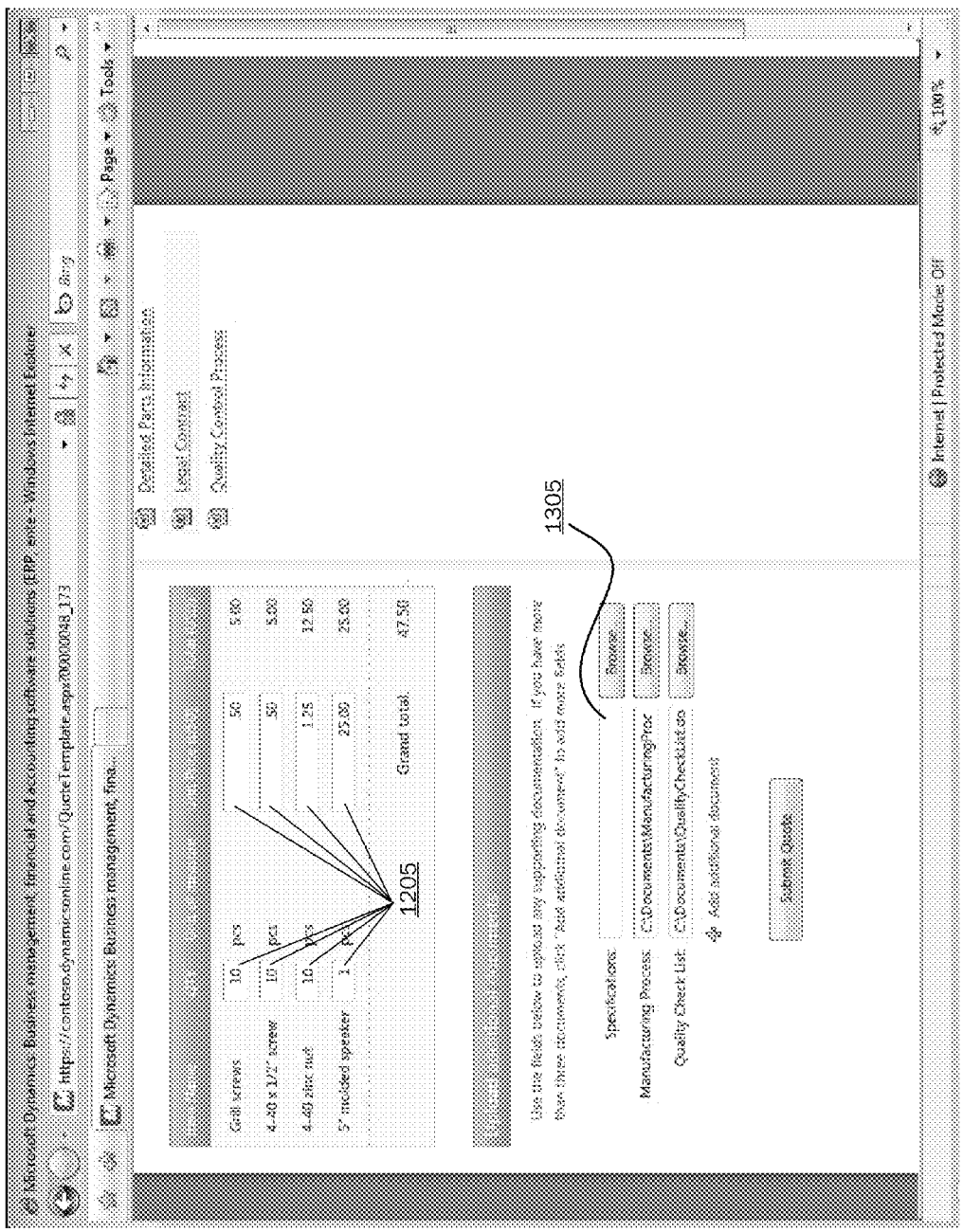
FIG. 13 is an illustration of a page of a published web-based structured data solution within which an end user may input data which will be synchronized with a business application system.

Once a solution 120 is published, an abstract representation of data that is bound between a business application system 105 and a web-based structured data solution 115 may be presented to an end user 104. As illustrated in FIGS. 12 and 13, a web-based visual representation of the structured data solution 115 may contain fields 1205 in which an end user 104 may enter information. For example, as illustrated in FIG. 12, a page may contain fields in which to enter contact information 1205. Each field 1205 may be bound to a field in the business application 105. Upon submission by the end user 104, the information entered into each field 1205 in a web-based visual representation of the structured data solution (web page) 115 may be published into the business application 105 via data binding between the fields 1205 and associated data objects in or associated with the business application 105. According to embodiments, as illustrated in FIG. 13, a field 1305 may be provided for uploading a document, which may be submitted to a business application user 102.

Figure 14:
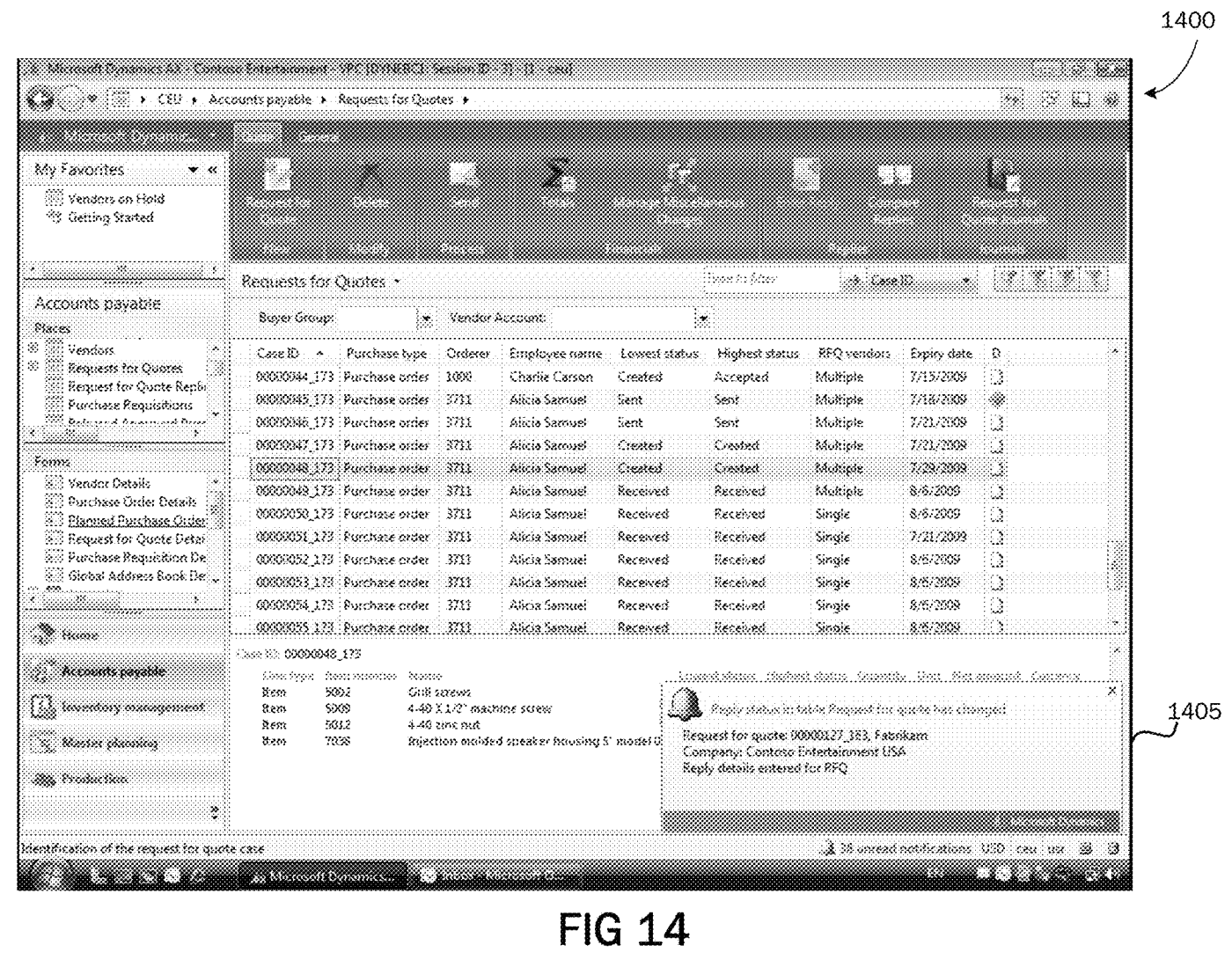

As should be appreciated, a number of solutions 120 and associated web pages 115 may be developed and published for and used from a given business application 105. For example, a given business application user 102 may have developed and may be running tens of web pages 115 at any given time covering tens of facets of his/her business or organization workloads and/or functions. As illustrated in FIG. 14, a user interface 1400 may be provided in which a business application user 102 may view statuses of various solutions 120. A notification (e.g., email, pop-up message, etc.) may be provided when a status of a solution 120 changes. For example, if an end user 104 responds to an RFQ, a pop-up message 1405 may be displayed. A business application user 102 may view submitted data, and may make a status change. For example, a procurement agent may accept or reject an RFQ, or may return it and ask for additional information. The change of status may be published to the web-based visual representation of the structured data solution 115 so that the end user 104 may view the status and may react accordingly. According to embodiments, presentation views may be based on a status of the entity. That is, presentation of a page may be designed by a business application user 102 so that for a given status, the page may be presented in a specific way. For example, if an RFQ has been accepted, the web-based visual representation of the structured data solution 115 may be displayed to the end user 104 with a "Congratulations!" text included.

Figure 15:
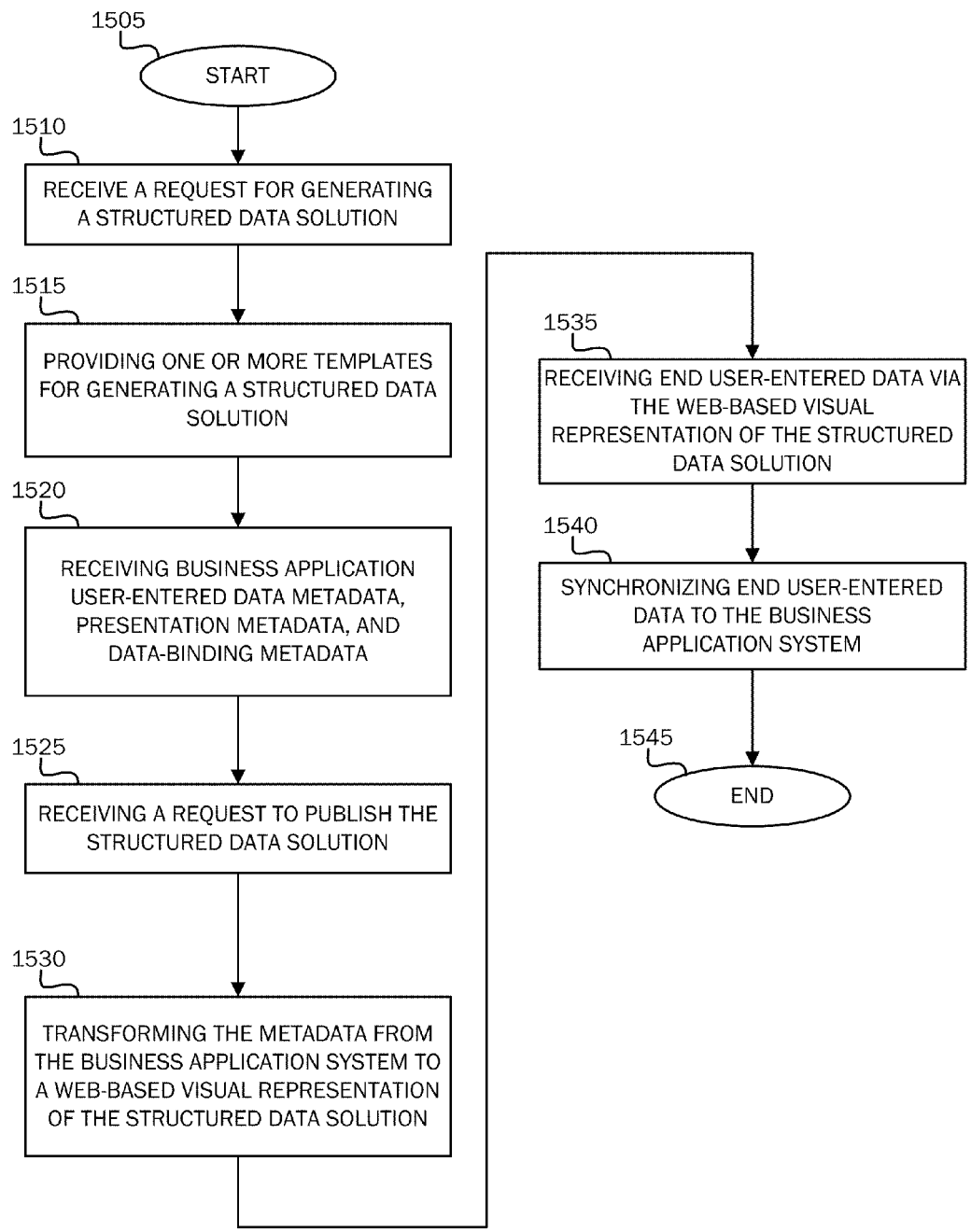
FIG. 15 is a logical flow diagram illustrating a method for generating, binding, publishing, and synchronizing a web-based structured data solution with a business application system.

Having described an operating architecture for and various aspects of embodiments of the present invention, FIG. 15 is a logical flow diagram illustrating a method for providing a transformation of metadata between a business application 105 to a web page 115 via the cloud 110, a receiving of data collected as a part of that web page, and a transformation of received data back into a format for synchronization with the business application.

The method 1500 starts at OPERATION 1505, and proceeds to OPERATION 1510, where a request for generating a web-based structured data solution 120 that will be presented as a web-based structured data solution and associated web page presentation 115 is received. A request for generating a solution 120 may occur when a selection to enable a new scenario is made by a business application user 102. As described above, a scenario that may be enabled by a business application user 102 may include, but is not limited to, vendor enrollment, sourcing, time entry, job listings, vendor managed inventory, lead capture, purchase order/invoicing, service contract renewal, and customer support requests. A variety of selectable functionalities for creating a new scenario may be provided within a UI from which a business application user 102 may select.

Upon receiving a request to create a new scenario, at OPERATION 1515, one or more templates 170 may be provided for generating a web-based structured data solution 120. Using a selected template, a developer of the web-based structured data solution may identify one or more data types (e.g., name, education, experience data types for an employment application solution) associated with the business application where each of the one or more data types will be associated with an end user input data type. Identifying one or more data types associated with the business application may include identifying one or more data types for which data is required in association with a designated structured data solution, for example, an employment application structured data solution.

As described above, a template 170 may be defined by presentation metadata 130. A template may provide a set of data, semantics, for example textual statements (e.g., "Enter Your Name Here"), and visual elements that a business application user 102 may manipulate. Various templates 170 may be provided for various solution scenarios. For example, referring back to FIG. 8, a page type may be selected based on a scenario for which a business application user 102 may be creating. As illustrated in FIG. 8, the business application user 102 has selected to create a new vendor request for quote 305. Accordingly, various template 170 selections are provided to the user 102 from which to choose. An image and description 815 of provided templates 170 may be displayed to help the user 102 select a desired template.

Upon selection of a template 170, the method 1500 proceeds to OPERATION 1520, where business application user-entered data 125, presentation data 130, data-binding data 135 is received. The one or more data types identified by the developer of the solution may be associated with corresponding one or more data fields in a web-based structured data solution template so that data entered into any of the one or more data fields in a displayed form of the web-based structured data solution will be associated with corresponding one or more identified data types associated with the business application. Association of the identified one or more data types with corresponding one or more data fields in a web-based structured data solution template may include receiving the association of the one or more data types with corresponding one or more data fields in a web-based structured data solution template so that data entered into any of the one or more data fields may be received by the business application and may be integrated with the business application in association with the one or more identified data types.

According to embodiments, a data field may appear inside a repeater or a grid. Accordingly, the data field may be replicated multiple times on a web page presentation depending on the actual number of data entities to which it may be bound. That is, data may be shown to the end user 104 via the web page 115 in a tabular format which binds to a collection of same type of records in the business application 105 instead of just one record. An example would be a web page to show all the job listings in a company job site. The binding may be described for a repeater in terms of a template row which contains a representative set of controls and their respective bindings to the fields of a backend data entity. During runtime, a determination may be made as to how many instances of the data entity are to be loaded on the web page. Based on that determination, a table may be generated with each row of the table representing one data entity instance.

Information specified in the template 170 may be customized and edited. Fields may be added, deleted, or modified according to the business application user's 102 needs. Data elements may be selected, and binding data 135 may be defined by the user 102. Various fields may be defined for receiving information from an end user 104. According to embodiments the template 170 associated with the designated web-based structured data solution may have one or more fields for associating with the one or more identified data types associated with the business application. The template may have one or more visual elements to be displayed in a displayed form of the web page 115 presentation. Additionally, the template may have one or more textural semantics (e.g., "Enter Education Information Here") for aiding an end user of a displayed form of the web page presentation to provide end user data to the structured data solution for one or more of the identified one or more data types. The template 170 may also provide a visual image of the template to allow a developer of the web-based structured data solution to preview how a displayed form of the web page presentation will be presented when displayed to one or more end users. A simplistic UI may be provided for page creation so that business application users 102 may create structured data solutions 120 quickly and easily.

A business application user 102 may declare which data elements from within a business application 105 he/she would like to bind to elements within the web-based visual representation of the structured data solution 120. Embodiments of the present invention provide for declarations to be made by a business application user 102, without the business application user understanding how to write code. The user 102 may declare which elements to bind, and may declare how he/she would like to be presented.

According to embodiments, the data binding process may include generating an instance of the web-based structured data solution and binding the instance of the web-based structured data solution to the associated business application so that any changes to any of the one or more identified data types associated with the business application are reflected in corresponding one or more data fields in the instance of the web-based structured data solution. One or more relationships may be generated between each of the one or more data fields in the instance of the web-based structured data solution and corresponding data types in the associated business application for causing a reflection of any changes to any of the one or more identified data types associated with the business application in corresponding one or more data fields in the instance of the web-based structured data solution. A metadata may be associated with the one or more relationships between each of the one or more data fields in the instance of the web-based structured data solution and corresponding data types in the associated business application for binding the one or more relationships between the instance of the web-based structured data solution and corresponding data types in the associated business application.

In addition, a transformation of data received via the instance of the web-based structured data solution may be performed from a first form associated with the instance of the web-based structured data solution to a second form associated with the business application. For example data received via the web page 115 may be received according to one format or structuring language (e.g., HTML), but the data may need to be transformed to another format or structuring language (e.g., XML) for use by the associated business application. The established transformation may be described with a transformation metadata, and the transformation metadata may be bound to the associated business application for dictating the transformation of data received via the instance of the web-based structured data solution from a first form associated with the instance of the web-based structured data solution to a second form associated with the business application.

A data binding metadata may be associated with the web-based structured data solution for declaring how a displayed form of the web-based structured data solution (i.e., a web page 115) will be presented to an end user. A data binding metadata may also be associated with the web-based structured data solution for declaring how data entered into any of the one or more data fields in the instance of the web-based structured data solution is transported to the associated business application.

Upon receiving a request from the business application user 102 to publish the structured data solution 120 at OPERATION 1525, the method 1500 proceeds to OPERATION 1530, a web-based structured data solution is generated where relationships and constraints defined by the structured solution file 120 are established, data are transformed from the business application system 105 and are bound according to defined declarations and presentation metadata 130, and are displayed as a web-based visual representation of a structured data solution in the form of a web page 115 to an end user 104. Generating the web-based structured data solution may include generating the designated structured data solution such that data may be received for each of the identified data types, and generating the designated structured data solution may be performed at a computing system remote from the business application (e.g., the cloud 110) for allowing one or more end users to access the generated designated structured data solution via the remote computing system.

At OPERATION 1530, end user-entered data, such as one or more data entries entered into one or more data fields in the web page 115, may be received via the web page 115. As was illustrated in FIGS. 12 and 13, various fields may be provided to receive end user-entered data.

At OPERATION 1535, end user-entered data may be passed to the business application and stored in association with corresponding data types associated with the business application. That is the user-entered data may be synchronized with the business application system 105 as defined by binding metadata 135. The end user-entered data may be transformed so that the data may be utilized and uploaded to the business application system 105 and utilized as needed by the associated organization. As changes or updates are made by a business application user 102, the web page presentation 115 may be republished reflecting the changes or updates. A notification of a change or update to a solution scenario may be provided to business application users 102 and/or end users 104. Thus, the web page 115 may be utilized as a communication portal by which a business application user 102 and an end user 104 may receive and transmit business data.

Embodiments of the invention as described above may be implemented via local and remote computing and data storage systems, including the systems illustrated and described with reference to FIG. 1. Consistent with embodiments of the invention, the aforementioned memory storage and processing unit may be implemented in a computing device, such as computing device 1600 of FIG. 16. Any suitable combination of hardware, software, or firmware may be used to implement the memory storage and processing unit. For example, the memory storage and processing unit may be implemented with computing device 1600 or any other computing devices 1618, in combination with computing device 1600, wherein functionality may be brought together over a network in a distributed computing environment, for example, an intranet or the Internet, to perform the functions as described herein. The aforementioned system, device, and processors are examples and other systems, devices, and processors may comprise the aforementioned memory storage and processing unit, consistent with embodiments of the invention. Furthermore, computing device 1600 may comprise operating environment 100 as described above. Operating environment 100 is not limited to computing device 1600.

Figure 16:
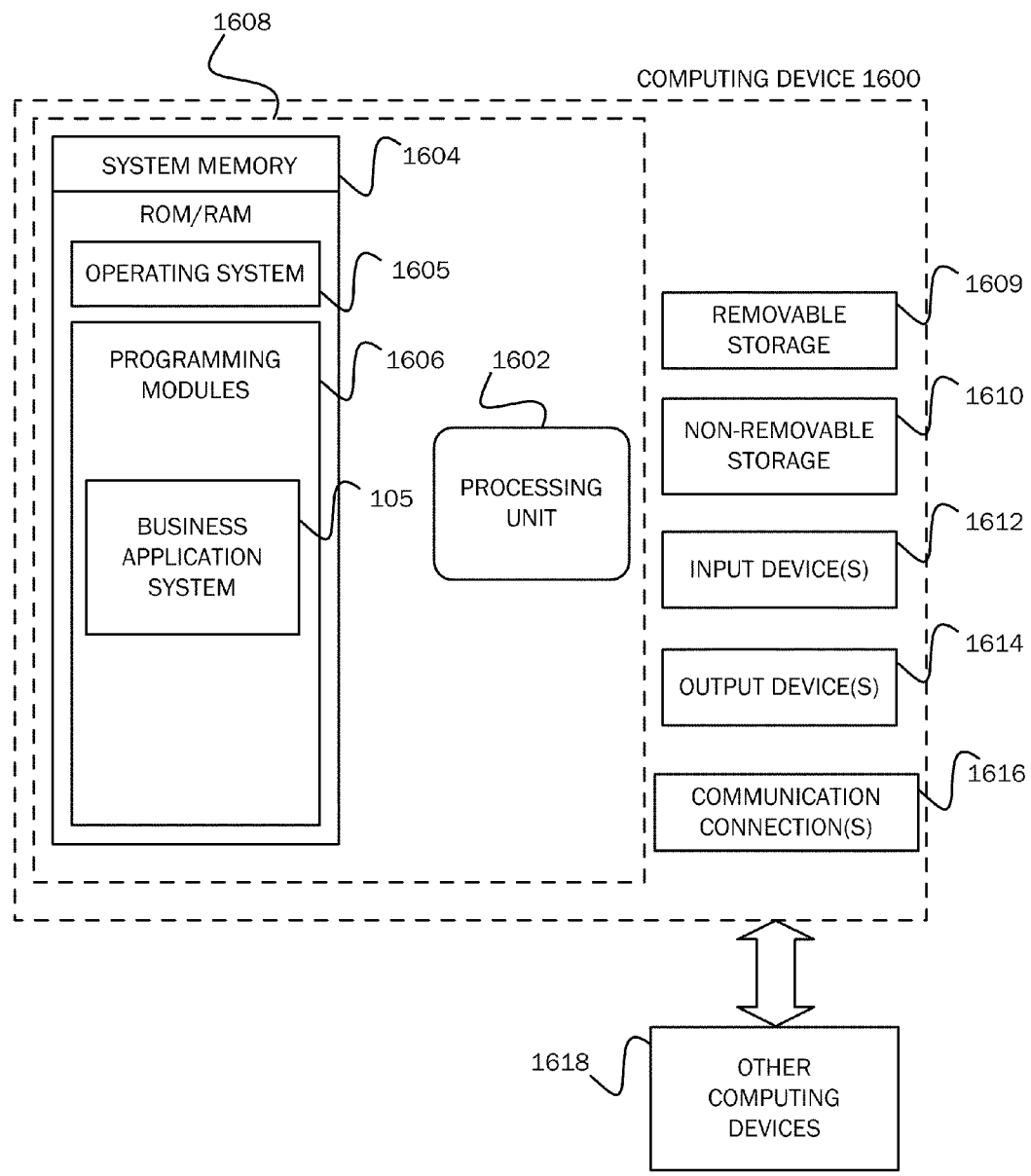
FIG. 16 is a simplified block diagram of a system including a computing device with which embodiments of the invention may be practiced.

With reference to FIG. 16, a system consistent with embodiments of the invention may include a computing device, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random access memory (RAM)), non-volatile (e.g. read-only memory (ROM)), flash memory, or any combination. System memory 1604 may include operating system 1605, one or more programming modules 1606, and may include a business application system 105, wherein the business application system is a software application having sufficient computer-executable instructions, which when executed, performs functionalities as described herein. Operating system 1605, for example, may be suitable for controlling computing device 1600's operation. Furthermore, embodiments of the invention may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computing device 1600 may also contain a communication connection 1616 that may allow device 1600 to communicate with other computing devices 1618, such as over a network in a distributed computing environment, for example, an intranet or the Internet. Communication connection 1616 is one example of communication media.

As stated above, a number of program modules and data files may be stored in system memory 1604, including operating system 1605. While executing on processing unit 1602, programming modules 1606 may include the business application system 105, wherein the business application system may contain sufficient computer-executable instructions, which when executed, perform functionalities as described herein. The aforementioned process is an example, and processing unit 1602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, etc. Output device(s) 1614 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments of the present invention, for example, are described above with reference to block diagrams and/or operational illustrations of methods, systems, and computer program products according to embodiments of the invention. The functions/acts noted in the blocks may occur out of the order as illustrated in any flowchart. For example, two blocks illustrated in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method of synchronizing a web-based structured data solution and an associated business application; comprising:
    generating a web-based structured data solution with which data may be communicated to a business application from a client device of a remote end user;
    identifying data types associated with the business application, each of the data types being associated with an end user input data type;
    binding, via metadata, the identified data types with corresponding data fields in a template of the web-based structured data solution, wherein the metadata declares how the web-based structured data solution is presented on a web page and how data entered into any of the data fields in the template is transported to the corresponding identified data types associated with the business application;
    generating a web-based presentation of the web-based structured data solution to present to end users via a web page for communicating with a business application;
    binding business application user-entered data to the presentation of the web-based structured data solution and data entered at the web page by the end user to the business application;
    in response to data being modified at the business application, the business application automatically pushing the modified data to the web-based structured data solution for synchronizing the web page, and in response to data at the web page being modified, synchronizing the modified data at the web page with the business application; and
    in response to the modified data of the business application and the modified data of the web page conflicting, determining whether the business application or the web page is a master source.

2. The method of claim 1, further comprising receiving data entries into data fields displayed in the web-based presentation of the web-based structured data solution.

3. The method of claim 2, further comprising passing the data entries from the data fields displayed in the web-based presentation of the web-based structured data solution to the business application and storing the data entries in association with the identified data types associated with the business application.

4. The method of claim 3, wherein passing the data entries from the data fields displayed in the web-based presentation of the web-based structured data solution to the business application includes transforming the data entries from a first data format associated with the web-based presentation of the web-based structured data solution to a second data format associated with the business application.

5. The method of claim 3, wherein passing the data entries from the data fields displayed in the web-based presentation of the web-based structured data solution to the business application includes passing the data entries from the data fields displayed in the web-based presentation of the web-based structured data solution to the business application according to a data binding between the web-based structured data solution and the business application.

6. The method of claim 1, wherein identifying data types associated with the business application includes identifying data types for which data is required in association with the web-based structured data solution.

7. The method of claim 6, further comprising generating the web-based structured data solution such that data may be received for each of the identified data types.

8. The method of claim 7, further comprising generating the web-based structured data solution at a computing system remote from the business application for allowing end users to access the generated web-based structured data solution via the remote computing system.

9. The method of claim 1, further comprising entering data into data fields received by the business application and integrated with the business application in association with the identified data types.

10. The method of claim 1, further comprising receiving a request for generating the web-based structured data solution with which data may be communicated to an enterprise resource planning (ERP) system from a client device of a remote end user.

11. The method of claim 1, further comprising, upon a determination that any of received data entries entered into the template of the web-based structured data solution conflict with the corresponding identified data types associated with the business application, establishing one of the business application or web-based structured data solution as a master data source and automatically resolving any data conflicts between the business application and the web-based structured data solution according to the established master data source.

12. The method of claim 11, further comprising providing a notification of any data conflicts between the business application and the web-based structured data solution.

13. A computer readable storage, not including a propagated signal, containing computer executable instructions which when executed by a computer perform a method of synchronizing a web-based structured data solution and an associated business application, comprising:
    generating a web-based structured data solution with which data may be communicated to a business application from a client device of a remote end user;
    identifying data types associated with the business application, each of the data types being associated with an end user input data type;
    binding, via metadata, the data types with corresponding data fields in a template of the web-based structured data solution, wherein the metadata declares how the web-based structured data solution is presented on a web page and how data entered into any of the data fields of the template may be received by the business application and may be integrated with the business application in association with the identified data types;
    generating a web-based presentation of the web-based structured data solution to present to end users via a web page for communicating with a business application;

binding business application user-entered data to the presentation of the web-based structured data solution and data entered at the web page by the end user to the business application;

in response to data being modified at the business application, the business application automatically pushing the modified data to the web-based structured data solution for synchronizing the web page, and in response to data at the web page being modified, synchronizing the modified data at the web page with the business application; and in response to the modified data of the business application and the modified data of the web page conflicting, determining whether the business application or the web page is a master source.

14. The computer readable storage of claim 13, further comprising transforming data entries from a first data format associated with the web-based presentation of the web-based structured data solution to a second data format associated with the business application.

15. The computer readable storage of claim 14, further comprising receiving the data entries from data fields displayed in the web-based presentation of the web-based structured data solution at the business application according to a data binding between the web-based structured data solution and the business application.

16. The computer readable storage of claim 13, further comprising:

establishing one of the business application or web-based structured data solution as a master data source and automatically resolving any data conflicts between the business application and the web-based structured data solution according to the established master data source.

17. The computer readable storage of claim 16, further comprising providing a notification of any data conflicts between the business application and the web-based structured data solution.

18. A system for synchronizing a web-based structured data solution and an associated business application; comprising:

a processor; and a system memory including computer readable instructions that, when executed by the processor, provides a computing system operative to receive a request for generating a web-based structured data solution with which data may be communicated to a business application from a client device of a remote end user;

to identify data types associated with the business application, each of the data types being associated with an end user input data type;

to bind, via metadata, the identified data types with corresponding data fields in a web-based structured data solution template, wherein the metadata declares how the web-based structured data solution is presented on a web page and how data entered into any of the data fields in the web-based structured data solution is transported to the corresponding identified data types associated with the business application;

to generate a web-based presentation of the web-based structured data solution;

to present the web-based presentation of the web-based structured data solution via the web page;

in response to data associated with the identified data types being modified at the business application, the business application to automatically push the modified data to the web-based structured data solution for synchronizing the web page, and in response to data at the web page being modified, to synchronize the modified data at the web page with the business application; and in response to the modified data of the business application and the modified data of the web page conflicting, to perform conflict resolution by determining whether the business application or the web page is a master source.

19. The system of claim 18, being further operative to receive data entries entered into data fields displayed in the web-based presentation of the web-based structured data solution;

to transform the data entries from a first data format associated with the web-based presentation of the web-based structured data solution to a second data format associated with the business application; and to pass the transformed data entries from the data fields displayed in the web-based presentation of the web-based structured data solution to the business application.

* * * * *